United States Patent [19]

Perret et al.

[11] 4,185,305
[45] Jan. 22, 1980

[54] VIDEO INFORMATION RECORDING AND REPRODUCING METHODS AND APPARATUS

[75] Inventors: Ludwig A. Perret, La Canada; James A. Miller, Chatsworth, both of Calif.

[73] Assignee: Bell & Howell Company, Chicago, Ill.

[21] Appl. No.: 597,051

[22] Filed: Jul. 18, 1975

Related U.S. Application Data

[63] Continuation-in-part of Ser. No. 448,117, Mar. 4, 1974, abandoned.

[51] Int. Cl.² ............................................. H04N 5/78
[52] U.S. Cl. ........................................ 360/33; 360/70; 358/114; 179/1.5 C
[58] Field of Search ...................... 360/27, 33, 37, 60, 360/70; 179/1.5 C; 178/5.7; 358/114, 118

[56] References Cited

U.S. PATENT DOCUMENTS

| | | | |
|---|---|---|---|
| 2,601,505 | 6/1952 | Ellett | 358/114 |
| 3,067,280 | 12/1962 | Schlafly, Jr. | 358/118 |
| 3,460,161 | 8/1969 | Waller et al. | 178/5.1 |
| 3,919,462 | 11/1975 | Hartung et al. | 178/5.1 |
| 4,030,128 | 6/1977 | Perret | 358/114 |

*Primary Examiner*—James W. Moffitt
*Attorney, Agent, or Firm*—Benoit Law Corporation

[57] ABSTRACT

Methods and apparatus for recording and subsequently reproducing video signals including video and synchronization information initially record the video signals and first control information distinct from said video and synchronization information on a recording medium. The video signals are subsequently reproduced with the aid of second control information being distinct from said video and synchronization information for controlling the reproduction of the video signals from the recording medium. The mentioned first control information is rendered incapable as recorded of controlling the reproduction of the video signals upon reproduction of the first control information, and the second control information is provided by reproducing the recorded first control information from the recording medium and converting at least part of the reproduced first control information to the second control information.

50 Claims, 2 Drawing Figures

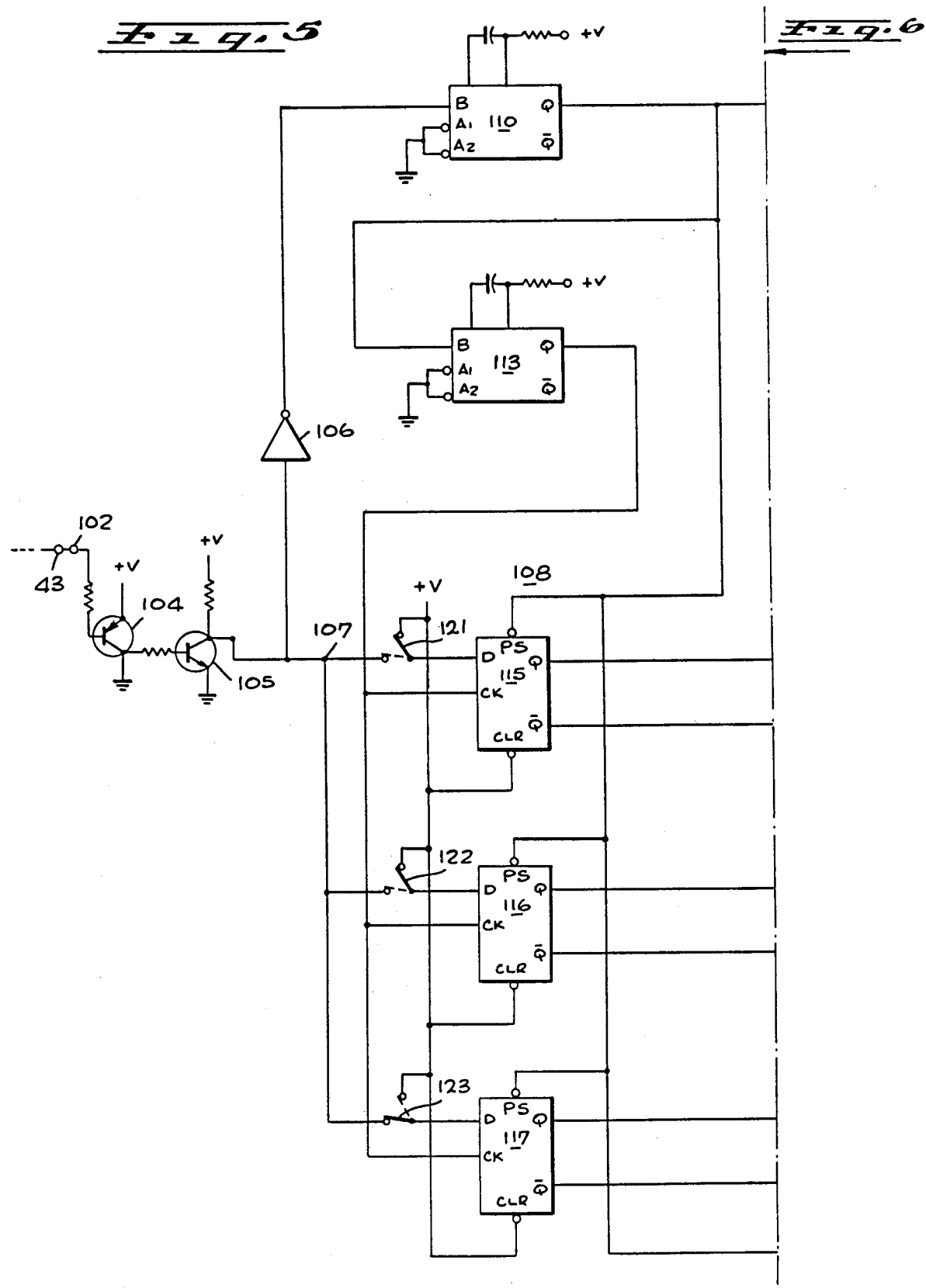

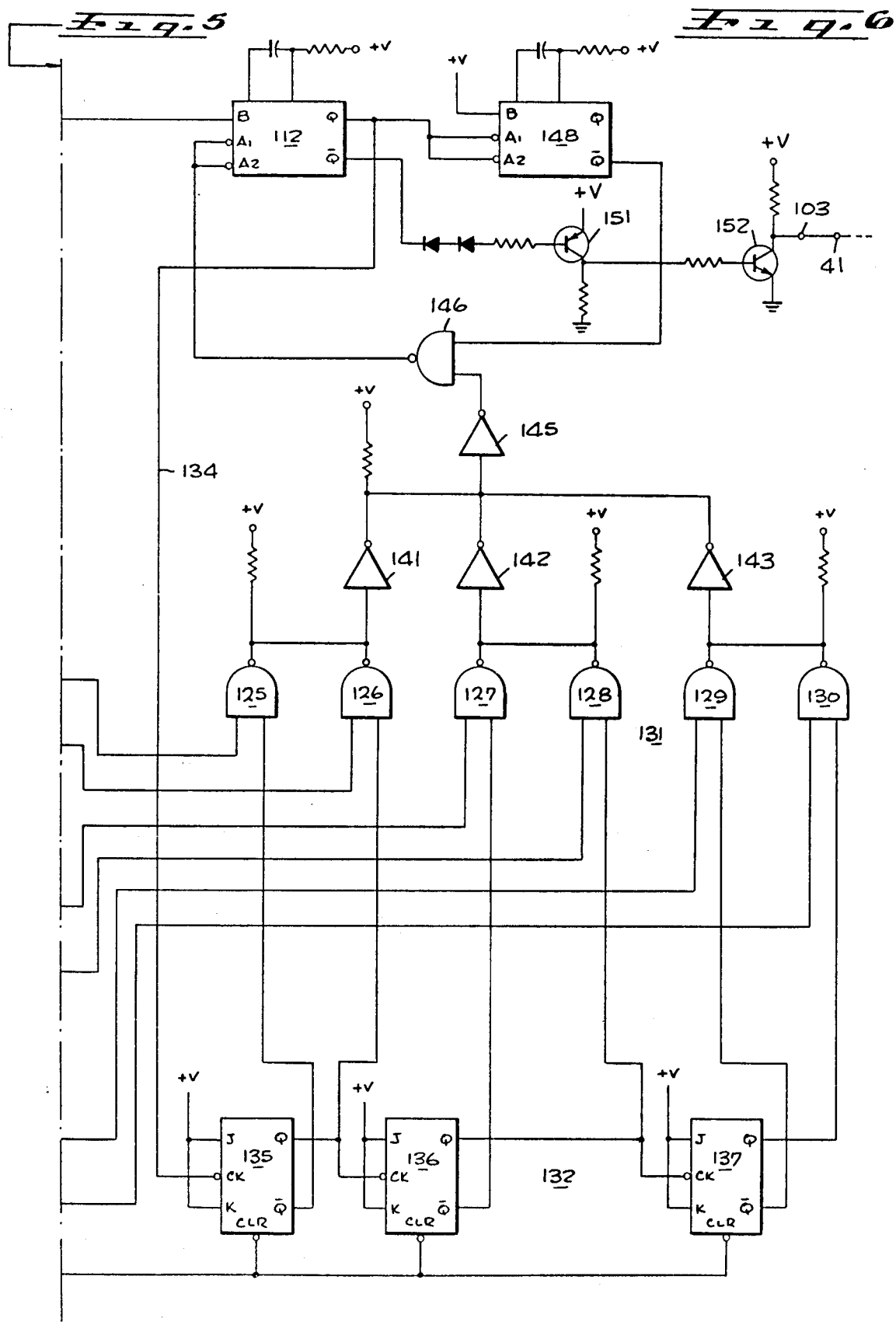

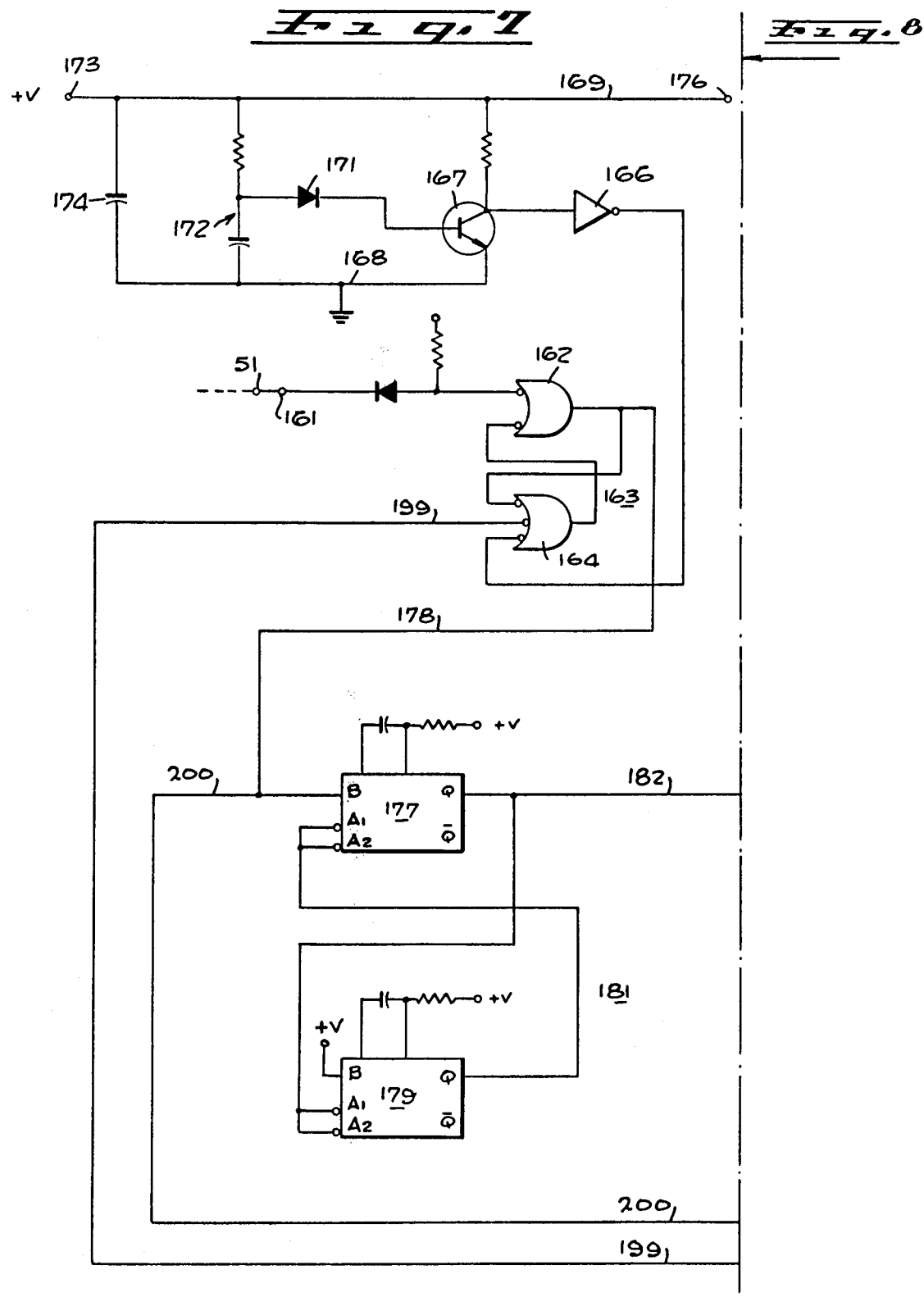

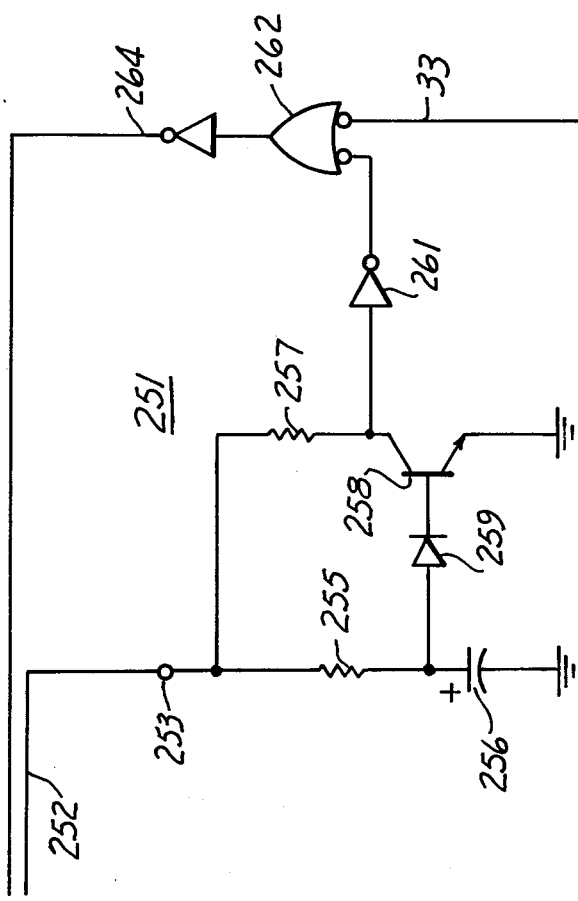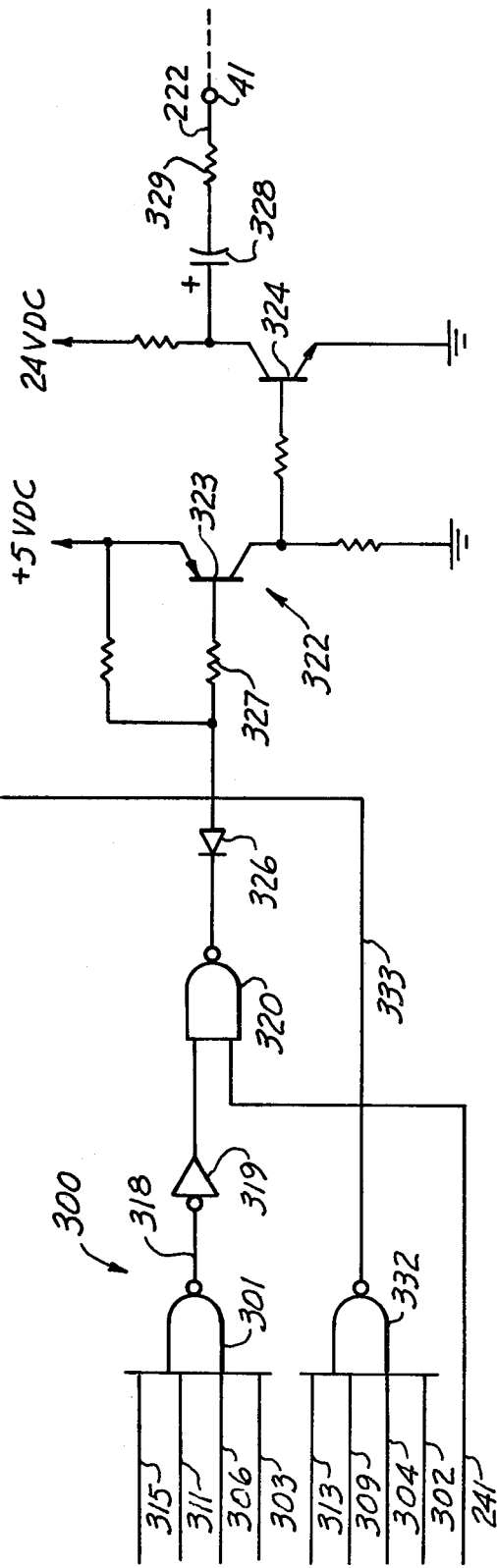

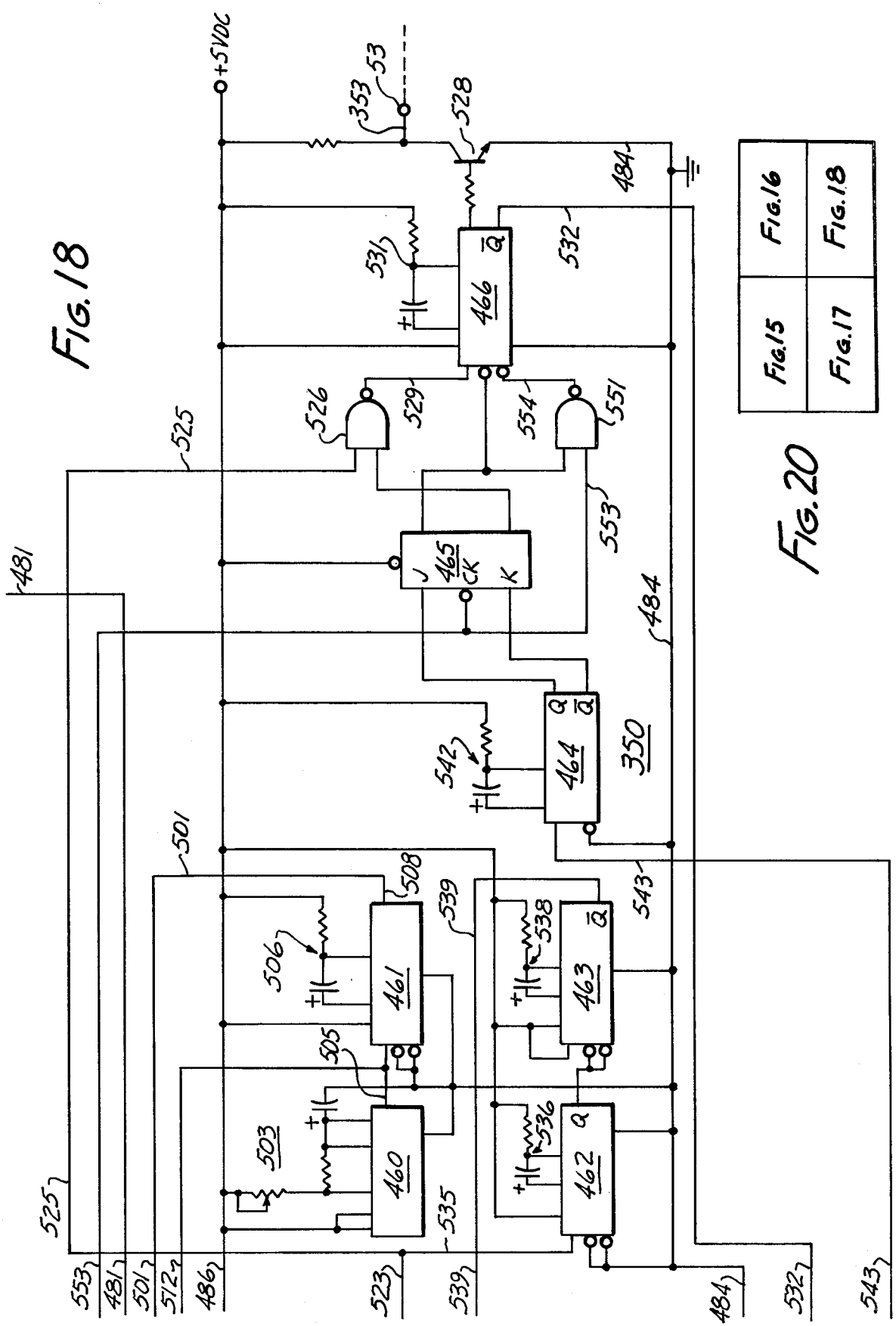

VIDEO INFORMATION RECORDING AND REPRODUCING METHODS AND APPARATUS

CROSS-REFERENCE

This is a continuation-in-part of Patent application Ser. No. 448,117 filed by the subject inventors on Mar. 4, 1974, now abandoned, and herewith incorporated by reference herein.

BACKGROUND OF THE INVENTION

1. Field of the Invention

The subject invention relates to methods and apparatus for recording and reproducing video information and, more specifically, to such methods and apparatus wherein theft, unauthorized reproduction and/or unauthorized copying of video recordings are substantially impeded.

2. Description of the Prior Art

The problem of theft, unauthorized reproduction and/or unauthorized copying of video recordings has become acute with the proliferation of video recording and/or reproduction equipment.

Unfortunately, video signal scrambling techniques of the type employed in video signal transmission are not suitable to adaptation to the video recording field, as such techniques tend to degrade the recorded and reproduced video signal, render the recording and reproduction equipment too complex and expensive and increase down time and service problems.

By way of example, reference is made to the television scrambling system disclosed in U.S. Pat. No. 3,460,161, by P. J. Waller et al, issued Aug. 5, 1969. In that and similar prior-art systems, scrambling is practiced on the television signal itself, by deliberately degrading the horizontal synchronization signal and introducing spurious signals that will disturb the video synchronization process in the receiver. Practice of that system also involves a distrubance of the video information, in that the picture waveforms are shifted in time and cut off on one side.

SUMMARY OF THE INVENTION

It is a general object of this invention to overcome the above mentioned disadvantages.

It is a more specific object of this invention to provide video recording and reproducing methods and apparatus which employ improved techniques and equipment for impeding theft, unauthorized reproduction and unauthorized copying of video recordings.

It is a germane object of this invention to provide improved video recording and reproducing methods and apparatus which do not resort to degradation or modification of the picture signal or synchronization information but still provide effective protection against theft, unauthorized reproduction and unauthorized copying of video recordings.

It is also an object of this invention to exploit every area of utility for which the methods and apparatus herein disclosed are suitable with or without modifications and variations within the spirit and scope of the subject invention.

Other objects will appear in the further course of this disclosure.

From one aspect thereof, the invention resides in a method of recording and subsequently reproducing video signals including video and synchronization information. The invention according to this aspect resides, more specifically, in the improvement comprising in combination the steps of recording said video signals and first control information distinct from said video and synchronization information on a recording medium, reproducing said video signals with the aid of second control information being distinct from said video and synchronization information for controlling the reproduction of said video information from said recording medium, said first control information being rendered incapable as recorded of controlling the reproduction of said video signals upon reproduction of said first control information, and said second control information being provided by reproducing said recorded first control information from said recording medium and converting at least part of said reproduced first control information to said second control information.

From another aspect thereof, the invention resides in a method of recording video signals including video and synchronization information and subsequently reproducing said video signals with reproduction equipment requiring control information distinct from said video and synchronization information and conforming to a predetermined standard. The invention according to this aspect resides, more specifically, in the improvement comprising in combination the steps of providing substandard control information distinct from said video and synchronization information and capable of being converted to control information conforming to said predetermined standard, recording said video signals and said substandard control information on a recording medium, reproducing said substandard control information with said reproduction equipment from said recording medium, converting said reproduced substandard control information to control information conforming to said predetermined standard, and reproducing said video signals and controlling continued reproduction of said recorded video signals from said recording medium with the latter control information conforming to said predetermined standard.

From another aspect thereof, the invention resides in a method of recording video signals including video and synchronization information and subsequently reproducing said video signals with reproduction equipment requiring second control information distinct from said video and synchronization information and having at least a predetermined number of pulses per second. The invention according to this aspect resides, more specifically, in the improvement comprising in combination the steps of providing first control information distinct from said video and synchronization information and having less than said predetermined number of pulses per second, recording said video signals and said first control information on a recording medium, reproducing said first control information from said recording medium, generating said second control information having at least said predetermined number of pulses per second with said reproduced first control information, and reproducing said video signals and controlling continued reproduction of said recorded video signals from said recording medium with said generated second control information.

From another aspect thereof, the invention resides in a method of recording video signals including video and synchronization information for subsequent reproduction with the aid of second control information for controlling the reproduction of said video signals. The invention according to this aspect resides, more specifically, in the improvement comprising in combination the steps of providing first control information distinct from said video and synchronization information and incapable of controlling the reproduction of said video signals but being convertible to said second control information, recording said video signals and first control information distinct from said video and synchronization information, and recording with said first control information a supplemental signal for concealing the nature of said first control information.

From another aspect thereof, the invention resides in a method of recording video signals including video and synchronization information for subsequent reproduction with reproduction equipment requiring control information conforming to a predetermined standard. The invention according to this aspect resides, more specifically, in the improvement comprising in combination the steps of providing substandard control information distinct from said video and synchronization information and capable of being converted to control information conforming to said predetermined standard, recording said video signals and said substandard control information distinct from said video and synchronization information on a recording medium, and recording with said substandard control information a supplemental signal for concealing the nature of said substandard control information.

From another aspect thereof, the invention resides in a method of recording video signals including video and synchronization information for subsequent reproduction with reproduction equipment requiring second control information having at least a predetermined number of pulses per second. The invention according to this aspect resides, more specifically, in the improvement comprising in combination the steps of providing first control information distinct from said video and synchronization information and having less than said predetermined number of pulses per second for controlling generation of said second control information upon reproduction, and recording said video signals and said first conntrol information distinct from said video and synchronization information.

From another aspect thereof, the invention resides in a method of reproducing video signals including video and synchronization information having been recorded on a recording medium together with first control information distinct from said video and synchronization information and being incapable of controlling the reproduction of said video signals. The invention according to this aspect resides, more specifically, in the improvement comprising in combination the steps of composing said recorded first control information of a recorded first part and a recorded second part for concealing the nature of said recorded first part reproducing both said recorded first and second parts of said first control information, distinguishing said reproduced first part of said first control information from said reproduced second part, converting said distinguished reproduced first part of said first control information to second control information distinct from said video and synchronization information for controlling reproduction of said video signals from said recording medium, and reproducing said video signals and controlling continued reproduction of said video signals from said recording medium with said second control information.

From another aspect thereof, the invention resides in a method of reproducing video signals including video and synchronization information having been recorded on a recording medium together with substandard control information distinct from said video and synchronization information and capable of being converted to standard control information for controlling reproduction of said video signals from said recording medium. The invention according to this aspect resides, more specifically, in the improvement comprising in combination the steps of composing said recorded substandard control information of a recorded first part capable of being converted to said standard control information and a recorded second part for concealing the nature of said first part, reproducing both of said recorded first and second parts of said substandard control information, distinguishing said reproduced first part from said reproduced second part, converting said reproduced first part of said substandard control information to said standard control information, and reproducing said video signals and controlling continued reproduction of said recorded video signals from said recording medium with the latter standard control information.

From another aspect thereof, the invention resides in a method of reproducing video signals including video and symchronization information having been recorded on a recording medium together with first control information distinct from said video and synchronization information and having an insufficient number of pulses per second for controlling the reproduction of said video signals from said recording medium. The invention according to this aspect resides, more specifically, in the improvement comprising in combination the steps of reproducing said first control information having said insufficient number of pulses per second, generating with said reproduced first control information second control information having a sufficient number of pulses per second for controlling the reproduction of said video signals from said recording medium, and reproducing said video signals and controlling continued reproduction of said video signals from said recording medium with said generated second control information.

From another aspect thereof, the invention resides in apparatus for recording and subsequently reproducing video signals including video and synchronization information on and from a recording medium. The invention according to this aspect resides, more specifically, in the improvement comprising, in combination, means for recording said video signals and first control information distinct from said video and synchronization information on said recording medium, means for reproducing said video information with the aid of second control information being distinct from said video and synchronization information for controlling the reproduction of said video signals from said recording medium, said apparatus including means connected to said recording means for rendering said first control information incapable as recorded of controlling the reproduction of said video signals upon reproduction of said first control information, and said apparatus including means for providing said second control information, said second control signal providing means including means for reproducing said recorded first control information from said recording medium and means for converting at least part of the reproduced first control information to said second control information.

From another aspect thereof, the invention resides in apparatus for recording video signals including video and synchronization information on a recording medium and subsequently reproducing said video signals with reproduction equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, means for recording said video signals and said substandard control information on said recording medium, means for reproducing said substandard control information with said reproduction equipment from said recording medium, means connected to said control information reproducing means for converting said reproduced substandard control information to control information conforming to said predetermined standard, means for reproducing said video signals, and means connected to said converting means for controlling continued reproduction of said recorded video signals from said recording medium with the latter control information conforming to said predetermined standard.

From another aspect thereof, the invention resides in apparatus for recording video signals including video and synchronization information on a recording medium and subsequently reproducing said video signals with reproduction equipment requiring second control information having at least a predetermined number of pulses per second. The invention according to this aspect resides, more specifically, in the improvement comprising, in combination, means for providing first control information distinct from said video and synchronization information and having less than said predetermined number of pulses per second, means for recording said video signals and said first control information on said recording medium, means for reproducing said first control information from said recording medium, means connected to said reproducing means for generating said second control information having at least said predetermined number of pulses per second with said reproduced first control information, and means for reproducing said video signals and controlling continued reproduction of said recorded video signals from said recording medium with said generated second control information.

From another aspect thereof, the invention resides in apparatus for recording video signals including video and synchronization information for subsequent reproduction with the aid of second control information for controlling the reproduction of said video information. The invention according to this aspect resides, more specifically, in the improvement comprising, in combination, means for providing first control information distinct from said video and synchronization information and incapable of controlling the reproduction of said video information but being convertible to said second control information, means connected to said control information providing means for recording said video signals and first control information, and means for recording with said first control information a supplemental signal for concealing the nature of said first control information.

From another aspect thereof, the invention resides in apparatus for recording video signals including video and synchronization information for subsequent reproduction with reproduction equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, means connected to said control information providing means for recording said video signals and said substandard control information on said recording medium, and means for recording with said substandard control information a supplemental signal for concealing the nature of said substandard control information.

From another aspect thereof, the invention resides in apparatus for recording video signals including video and synchronization information for subsequent reproduction with reproduction equipment requiring second control information having at least a predetermined number of pulses per second. The invention according to this aspect resides, more specifically, in the improvement comprising, in combination, means for providing first control information distinct from said video and synchronization information and having less than said predetermined number of pulses per second for controlling generation of said second control information upon reproduction, and means connected to said control information providing signals for recording said video signals and said first control information.

From another aspect thereof, the invention resides in apparatus for reproducing video signals including video and synchronization information having been recorded on a recording medium together with first control information distinct from said video and synchronization information, being incapable of controlling the reproduction of said video signals and being composed of a recorded first part and a recorded second part for concealing the nature of said recorded first part. The invention according to this aspect resides, more specifically, in the improvement comprising, in combination, means for reproducing both said recorded first and second parts of said first control information, means connected to said reproducing means for converting said reproduced first part of said first control information to second control information distinct from said video and synchronization information for controlling reproduction of said video signals from said recording medium, means for reproducing said video signals, and means connected to said converting means for controlling reproduction of said video signals from said recording medium with said second control information.

From another aspect thereof, the invention resides in apparatus for reproducing video signals including video and synchronization information having been recorded on a recording medium together with substandard control information distinct from said video and synchronization information and capable of being converted to standard control information for controlling reproduction of said video information from said recording medium, said substandard control information being composed of a first part capable of being converted to said standard control information and a second part for concealing the nature of said first part. The invention according to this aspect resides, more specifically, in the improvement comprising, in combination, means for reproducing both said first and second parts of said substandard control information, means connected to said reproducing means for converting said reproduced first part of said substandard control information to said standard control information, means for reproducing said video signals, and means connected to said converting means for controlling continued reproduction of said recorded video signals from said recording medium with the latter standard control information.

From another aspect thereof, the invention resides in apparatus for reproducing video signals including video and synchronization information having been recorded on a recording medium together with first control information distinct from said video and synchronization information and having an insufficient number of pulses per second for controlling the reproduction of said video signals from said recording medium. The invention according to this aspect resides, more specifically, in the improvement comprising, in combination, means for reproducing said first control information having said insufficient number of pules per second, means connected to said reproducing means for generating with said reproduced first control information second control information having a sufficient number of pulses per second for controlling the reproduction of said video signals from said recording medium, and means connected to said converting means for controlling reproduction of said video signals from said recording medium with said second control information.

From another aspect thereof, the invention resides in apparatus for reproducing from a recording medium recorded video signals including video and synchronization information and being accompanied, in a first case, by first control information distinct from said video and synchronization information and incapable of controlling the reproduction of said video signals and, in a second case, by second control information distinct from said video and synchronization information and capable of controlling the reproduction of said video signals. The invention according to this aspect resides, more specifically, in the improvement comprising, in combination, means for reproducing said first control information in said first case and said second control information in said second case, means connected to said reproducing means for converting in said first case at least part of said reproduced first control information to third control information distinct from said video and synchronization information and capable of controlling the reproduction of said video signals from said recording medium, means for reproducing said video signals, and means for controlling reproduction of said video signals from said recording medium in said first case with said third control information, and in said second case with said second control information.

From another aspect thereof, the invention resides in apparatus for reproducing from a recording medium recorded video signals including video and synchronization information and being accompanied by first control information distinct from said video and synchronization information and incapable of controlling the reproduction of said video signals. The invention according to this aspect resides, more specifically, in the improvement comprising, in combination, means for reproducing said first control information, means for reproducing said video signals from said recording medium including rotary reproducing means and means for rotating said video signal reproducing means relative to said recording medium, means connected to said control information reproducing means for converting at least part of said reproduced first control information to second control information distinct from said video and synchronization information and capable of controlling the reproduction of said video signals from said recording medium, means connected to said converting means for modifying a phase of said second control information in accordance with an operation of said rotating video signal reproducing means, and means for controlling reproduction of said video signals from said recording medium with said phase modified second control information.

From another aspect thereof, the invention resides in apparatus for recording and subsequently playing back video signals including video and synchronization information on and from a recording medium. The invention according to this aspect resides, more specifically, in the improvement comprising, in combination, means for recording said video signals and first control information distinct from said video and synchronization information on said recording medium, playback means for effecting a playback of said video information from said recording medium, means connected to said playback means for controlling the playback of said video signals from said recording medium with second control information being distinct from said video and synchronization information, said apparatus including means connected to said recording means for rendering said first control information incapable as recorded of controlling the playback of said video signals upon reproduction of said first control information, and said apparatus including means for providing said second control information, said second control information providing means including means for reproducing said recorded first control information from said recording medium and means for converting at least part of the reproduced first control information to said second control information.

From another aspect thereof, the invention resides in apparatus for recording video signals including video and synchronization information on a recording medium and subsequently playing back said video signals with playback equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, means for recording said video signals and said substandard control information on said recording medium, means for playing back said substandard control information with said playback equipment from said recording medium, means connected to said control information playback means for converting said played back substandard control information to control information conforming to said predetermined standard, playback means for playing back said video signals, and means connected to said converting means for controlling continued playback of said recorded video signals from said recording medium with the latter control information conforming to said predetermined standard.

From another aspect thereof, the invention resides in apparatus for recording video signals including video and synchronization information for subsequent playback with the aid of second control information for controlling the playback of said video information. The invention according to this aspect resides, more specifically, in the improvement comprising, in combination, means for providing first control information distinct from said video and synchronization information and incapable of controlling the playback of said video information but being convertible to said second control information for controlling the playback of said video signals from a recording medium, and means connected to said first control information providing means for recording said video signals and first control information.

From another aspect thereof, the invention resides in a method of recording and subsequently reproducing video signals including video and synchronization information. The invention according to this aspect resides, more specifically, in the improvement comprising in combination the steps of establishing on the same recording medium a record of said video signals including said video and synchronization information and a further record of control information distinct from said video and synchronization information, reproducing said video signals with the aid of second control information being distinct from said video and synchronization information, said first control information as present in said further record being incapable of controlling the reproduction of said video signals upon reproduction of said first control information, and said second control information being provided by reproducing said recorded first control information from said further record and converting at least part of said reproduced first control information to said second control information.

From another aspect thereof, the invention resides in a method of recording video signals including video and synchronization information and subsequently reproducing said video signals with reproduction equipment requiring control information distinct from said video and synchronization information and conforming to a predetermined standard. The invention according to this aspect resides, more specifically, in the improvement comprising in combination the steps of providing substandard control information distinct from said video and synchronization information and capable of being converted to control information conforming to said predetermined standard, establishing on the same recording medium a record of said video signals and a further record of said substandard control information, reproducing said substandard control information with said reproduction equipment from said recording medium, converting said reproduced substandard control information to control information conforming to said predetermined standard, and reproducing said video signals and controlling continued reproduction of said recorded video signals from said recording medium with the latter control information conforming to said predetermined standard.

From another aspect thereof, the invention resides in a method of recording video signals including video and synchronization information for subsequent reproduction with the aid of second control information for controlling the reproduction of said video signals. The invention according to this aspect resides, more specifically, in the improvement comprising in combination the steps of providing first control information distinct from said video and synchronization information and incapable of controlling the reproduction of said video signals but being convertible to said second control information, and establishing on the same recording medium a record of said video signals including said video and synchronization information and a further record of said further control information distinct from said video and synchronization information.

From another aspect thereof, the invention resides in a method of recording video signals including video and synchronization information for subsequent reproduction with reproduction equipment requiring control information conforming to a predetermined standard. The invention according to this aspect resides, more specifically, in the improvement comprising in combination the steps of providing substandard control information distinct from said video and synchronization information and capable of being converted to control information conforming to said predetermined standard, and establishing on the same recording medium a record of said video signals including said video and synchronization information, and a further record of said substandard control information distinct from said record of said video signals including video and synchronization information on a recording medium.

From another aspect thereof, the invention resides in a method of reproducing recorded video signals including video and synchronization information from a first record on a recording medium bearing also a second record of first control information distinct from said video and synchronization information and incapable of controlling the reproduction of said video signals. The invention according to this aspect resides, more specifically, in the improvement comprising in combination the steps of reproducing said first control information from said second record on said recording medium, converting at least part of said reproduced first control information to second control information distinct from said video and synchronization information for controlling reproduction of said video signals from said recording medium, and reproducing said video signals including said video and synchronization information from said first record on said recording medium and controlling continued reproduction of said video signals from said first record on said recording medium with said second control information.

From another aspect thereof, the invention resides in a method of recording and subsequently reproducing video signals including video and synchronization information. The invention according to this aspect resides, more specifically in the improvement comprising in combination the steps of establishing on the same recording medium a record of said video signals and a further record of first control information distinct from said video and synchronization information, effecting a playback of said video signals from said recording medium and controlling said playback of said video signals from said recording medium with second control information being distinct from said video and synchronization information, said first control information as recorded in said further record being incapable of controlling the playback of said video signals upon reproduction of said first control information, and said second control information being provided by reproducing said recorded first control information from said further record on said recording medium and converting at least part of said reproduced first control information to said second control information.

From another aspect thereof, the invention resides in a method of recording video signals including video and synchronization information and subsequently playing back said video signals with playback equipment requiring control information distinct from said video and synchronization information and conforming to a predetermined standard. The invention according to this aspect resides, more specifically, in the improvement comprising in combination the steps of providing substandard control information distinct from said video and synchronization information and capable of being converted to control information conforming to said predetermined standard, establishing on the same recording medium a record of said video signals and a further record of said substandard control information, effecting a playback of said substandard control information with said playback equipment from said further record on said recording medium, converting said played back substandard control information to control information conforming to said predetermined standard, and effecting a playback of said video signals and controlling continued playback of said recorded video signals from said recording medium with the latter control information conforming to said predetermined standard.

From another aspect thereof, the invention resides in a method of recording video signals including video and synchronization information for subsequent playback with the aid of second control information for controlling the playback of said video signals. The invention according to this aspect resides, more specifically, in the improvement comprising in combination the steps of providing first control information distinct from said video and synchronization information and incapable of controlling the playback of said video signals but being convertible to said second control information for controlling the playback of said video signals from a recording medium, and establishing on the same recording medium a record of said video signals including said video and synchronization information, and a further record of said first control information distinct from said record of said video signals including video and synchronization information.

From another aspect thereof, the invention resides in apparatus for recording and subsequently reproducing video signals including video and synchronization information on and from a recording medium. The invention according to this aspect resides, more specifically, in the improvement comprising, in combination, means for establishing on said recording medium a record of said video signals including said video and synchronization information and, on the same recording medium, a further record of first control information distinct from said video and synchronization information, means for reproducing said video information with the aid of second control information being distinct from said video and synchronization information, said apparatus including means for rendering said first control information as present in said further record incapable of controlling the reproduction of said video signals upon reproduction of said first control information, and said apparatus including means for providing said second control information, said second control information providing means including means for reproducing said recorded first control information from said further record and means for converting at least part of the reproduced first control information to said second control information.

From another aspect thereof, the invention resides in apparatus for recording video signals including video and synchronization information on a recording medium and subsequently reproducing said video signals with reproduction equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, said control information providing means including means for rendering said substandard control information incapable, prior to its conversion to control information conforming to said predetermined standard, of controlling reproduction of said recorded video signals from said recording medium, means for establishing on said recording medium a record of said video signals and a further record of said substandard control information, means for reproducing said substandard control information with said reproduction equipment from said further record on said recording medium, means connected to said control information reproducing means for converting said reproduced substandard control information to control information conforming to said predetermined standard, means for reproducing said video signals, and means connected to said converting means for controlling continued reproduction of said recorded video signals from said recording medium with the latter control information conforming to said predetermined standard.

From another aspect thereof, the invention resides in apparatus for recording video signals including video and synchronization information for subsequent reproduction with reproduction equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, said control information providing means including means for rendering said substandard control information incapable, prior to its conversion to control information conforming to said predetermined standard, of controlling reproduction of said recorded video signals from said recording medium, and means connected to said control information providing means for recording said video signals and said substandard control information on said recording medium.

From another aspect thereof, the invention resides in apparatus for recording and subsequently playing back video signals including video and syncrhonization information on and from a recording medium. The invention according to this aspect resides, more specifically, in the improvement comprising, in combination, means for establishing on said recording medium a record of said video signals and on the same recording medium a further record of said first control information distinct from said video and synchronization information, playback means for effecting a playback of said video information from said recording medium, means connected to said playback means for controlling the playback of said video signals from said recording medium with second control information being distinct from said video and synchronization information, said apparatus including means connected to said recording means for rendering said first control information incapable as recorded of controlling the playback of said video signals upon reproduction of said first control information, and said apparatus including means for providing said second control information, said second control information providing means including means for reproducing said recorded first control information from said further record on said recording means and means for converting at least part of the reproduced first control information to said second control information.

From another aspect thereof, the invention resides in apparatus for recording video signals including video and synchronization information on a recording medium and subsequently playing back said video signals with playback equipment requiring control information conforming to a predetermined standard. The invention according to this aspect resides, more specifically, in the improvement comprising, in combination, means for providing substandard control information distinct from said video and synchronization information and capable of being converted to control information conforming to said predetermined standard, means for establishing on the same recording medium a record of said video signals and a further record of said substandard control information, means for playing back said substandard control information with said playback equipment from said further record on said recording medium, means connected to said control information playback means for converting said played back substandard control information to control information conforming to said predetermined standard, playback means for playing back said video signals, and means connected to said converting means for controlling continued playback of said recorded video signals from said recording medium with the latter control information conforming to said predetermined standard.

From another aspect thereof, the invention resides in a method of reproducing recorded video signals including video and synchronization information from a first record on a recording medium bearing also a second record of first control information distinct from said video and synchronization information and incapable of controlling the reproduction of said video signals. The invention according to this aspect resides, more specifically, in the improvement comprising in combination the steps of reproducing said first control information from said second record on said recording medium, converting at least part of said reproduced first control information to second control information distinct from said video and synchronization information for controlling reproduction of said video signals from said recording medium, and reproducing said video signals from said first record on said recording medium with playback head means moving relatively to said recording medium, and controlling the velocity of said playback head means with said second control information.

From another aspect thereof, the invention resides in a method of reproducing recorded video signals including video and synchronization information from a first record on a recording medium bearing also a second record of substandard control information distinct from said video and synchronization information and capable of being converted to standard control information for controlling reproduction of said video signals from said recording medium. The invention according to this aspect resides, more specifically, in the improvement comprising in combination the steps of reproducing said substandard control information from said second record on said recording medium, converting said reproduced substandard control information to said standard control information, and reproducing said video signals from said first record on said recording medium with playback head means moving relatively to said recording medium, and controlling the velocity of said playback head means with said second control information.

From another aspect thereof, the invention resides in apparatus for reproducing recorded video signals including video and synchronization information from a first record on a recording medium bearing also a second record of first control information distinct from said video and synchronization information and incapable of controlling the reproduction of said video signals. The invention according to this aspect resides, more specifically, in the improvement comprising, in combination, means for reproducing said first control information from said second record on said recording medium, means connected to said reproducing means for converting at least part of said reproduced first control information to second control information distinct from said video and synchronization information for controlling reproduction of said video signals from said recording medium, means for reproducing said video signals from said first record on said recording medium with playback head means moving relatively to said recording medium, and means connected to said converting means for controlling reproduction of said video signals from said recording medium with said second control information, said controlling means including means for controlling the velocity of said playback head means with said second control information.

From another aspect thereof, the invention resides in apparatus for reproducing recorded video signals including video and synchronization information from a first record on a recording medium bearing also a second record of substandard control information distinct from said video and synchronization information and capable of being converted to standard control information for controlling reproduction of said video information from said recording medium. The invention according to this aspect resides, more specifically, in the improvement comprising, in combination, means for reproducing said substandard control information from said second record on said recording medium, means connected to said reproducing means for converting said reproduced substandard control information to said standard control information, means reproducing said video signals from said first record on said recording medium with playback head means moving relatively to said recording medium, and means connected to said converting means for controlling continued reproduction of said recorded video signals from said recording medium with the latter standard control information, said controlling means including means for controlling the velocity of said playback head means with said second control information.

From another aspect thereof, the invention resides in apparatus for reproducing from a recording medium recorded video signals including video and synchronization information and being accompanied, in a first case, by first control information distinct from said video and synchronization information and incapable of controlling the reproduction of said video signals and, in a second case, by second control information distinct from said video and synchronization information and capable of controlling the reproduction of said video signals. The invention according to this aspect resides, more specifically, in the improvement comprising, in combination, means for reproducing said first control information in said first case and said second control information in said second case, means connected to said reproducing means for converting in said first case at least part of said reproduced first control information to third control information distinct from said video and synchronization information and capable of controlling the reproduction of said video signals from said recording medium, means for reproducing said video signals with playback head means moving relatively to said recording medium, and means for controlling reproduction of said video signals from said recording medium in said first case with said third control information, and in said second case with said second control information, said reproduction controlling means including means for controlling the velocity of said playback head means with said third control information in said first case, and with said second control information in said second case.

BRIEF DESCRIPTION OF THE DRAWINGS

The invention will become more readily apparent from the following detailed description of preferred embodiments thereof, illustrated by way of example in the accompanying drawings, in which:

FIGS. 2 and 3 constitute a circuit diagram of servo control equipment that may be employed in the apparatus of FIG. 1;

FIG. 4 is a diagrammatic showing of part of a tape recording produced by the apparatus of FIG. 1;

FIGS. 5 and 6 constitute a logic circuit diagram of a control signal encoder in accordance with a preferred embodiment of the subject invention;

FIGS. 7 and 8 constitute a logic circuit diagram of a control signal decoder in accordance with a further preferred embodiment of the subject invention;

FIGS. 9a, 9b and 9c are diagrammatic representations of waveforms explaining the operation of part of the equipment herein disclosed;

FIGS. 10, 11 and 12 show how the FIGS. 2 and 3, 5 and 6, and 7 and 8, respectively, are to be juxtaposed;

FIGS. 13 and 14 constitute a logic circuit diagram of a control signal encoder in accordance with a further preferred embodiment of the subject invention;

FIGS. 15, 16, 17 and 18 constitute a logic circuit diagram of a control signal decoder in accordance with a further preferred embodiment of the subject invention;

FIG. 19 shows how FIGS. 13 and 14 are to be juxtaposed; and

FIG. 20 shows how FIGS. 15 to 18 are to be juxtaposed.

DESCRIPTION OF PREFERRED EMBODIMENTS

Figure 1:
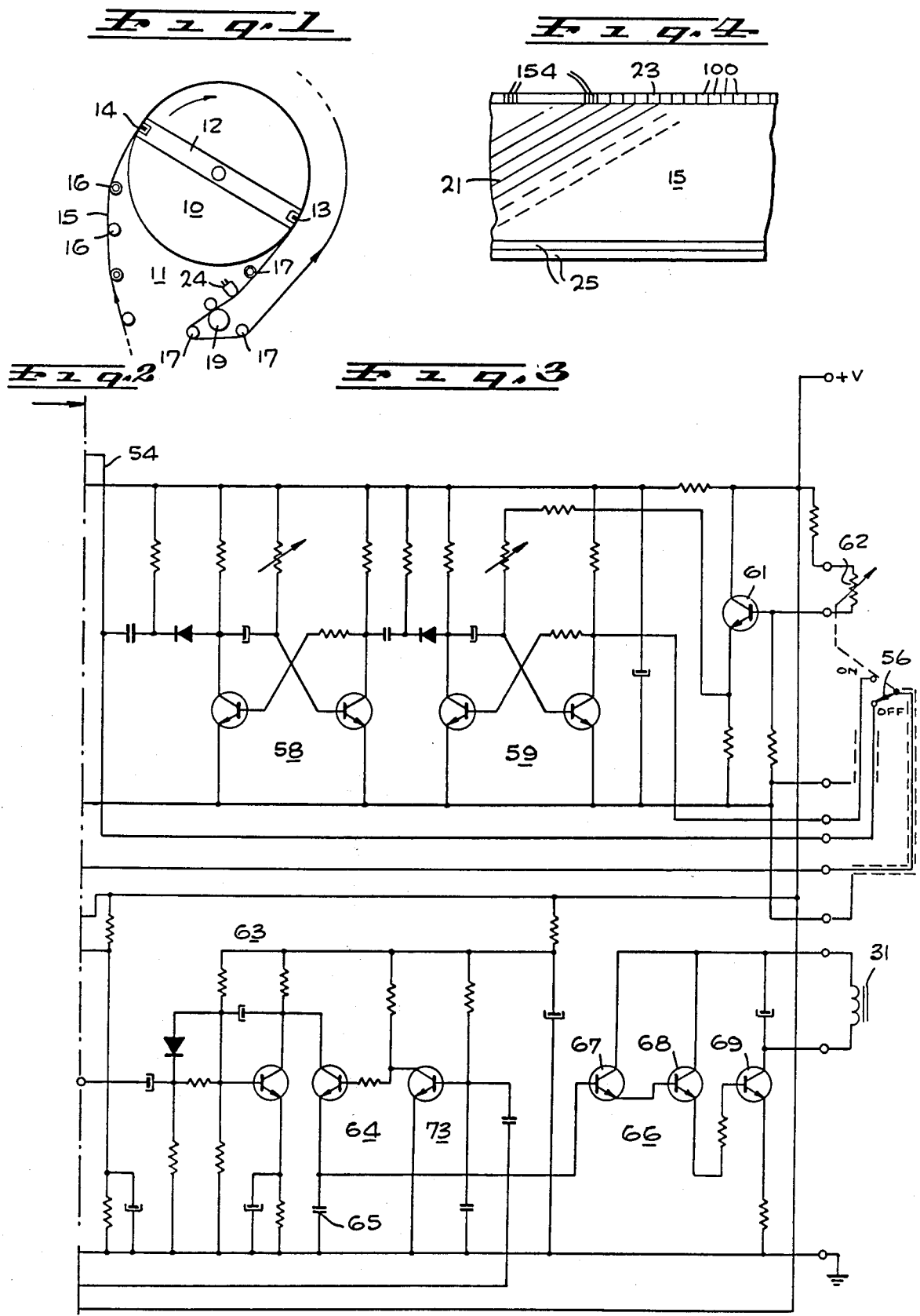
FIG. 1 is a diagrammatic top view of essential parts of a tape recording and playback apparatus as may be employed in the practice of the subject invention.
Figure 2:
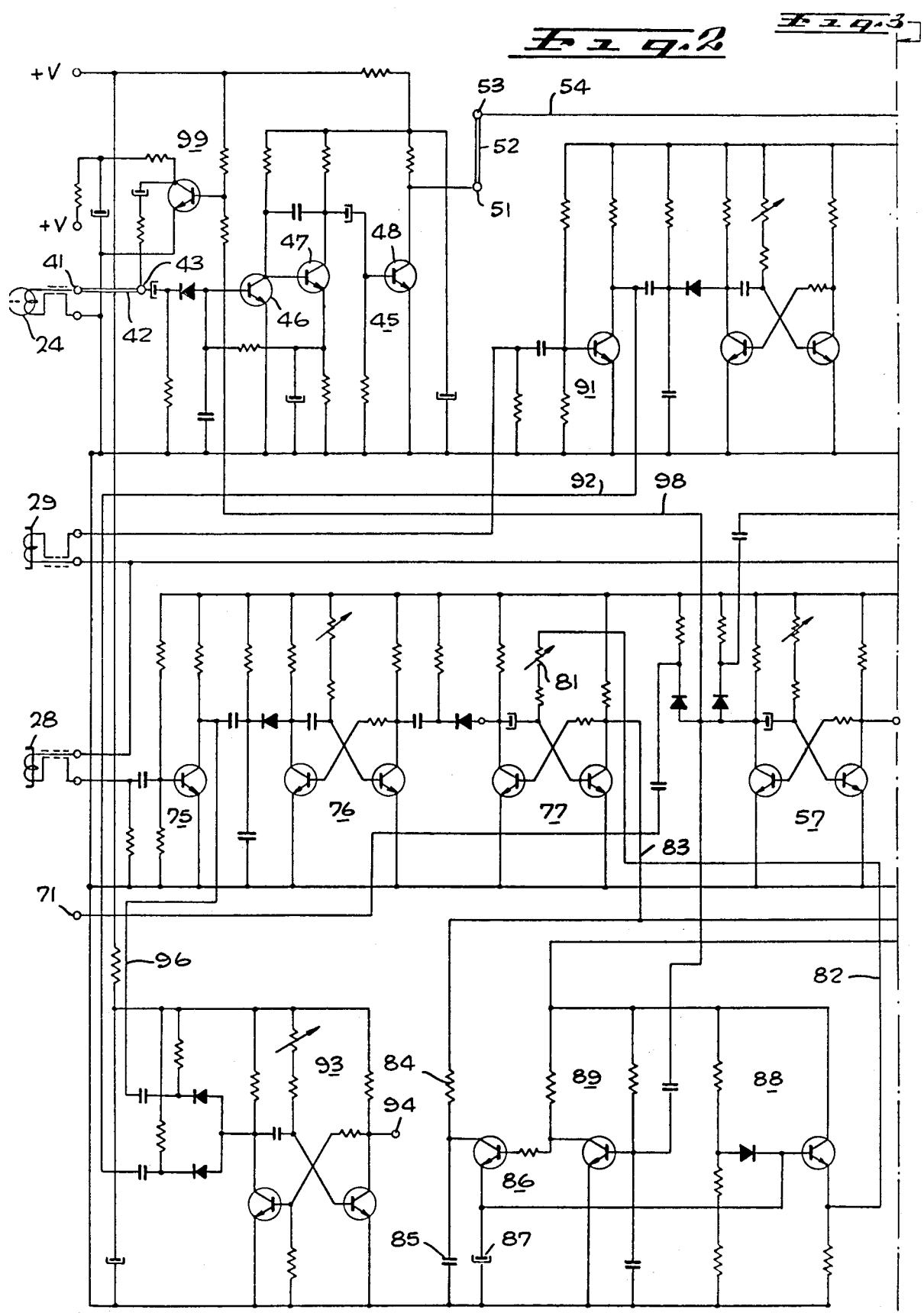

In order to disclose the subject invention within the frame work of one of its possible settings and in order to set forth the best mode presently contemplated of carrying out this invention, the subject matter of FIGS. 1 and 2 has been developed with reference to the videocassette recorder type VO-1600, manufactured by Sony Corporation. In this connection, reference may, for instance, be had to the Sony Service Manual VO-1600, published 1972.

FIG. 1 diagrammatically shows a head drum assembly of a video tape recording and reproducing apparatus 11. The head drum assembly 10 has a rotary support 12 for a pair of video recording and playback heads 13 and 14. Recording tape 15 from a tape cassette or other tape supply and takeup means (not shown) is guided by rollers 16 to the head drum assembly and by rollers 17 from the head drum assembly. Some of these rollers may be part of conventional tape threading equipment as, for instance, disclosed in the above mentioned Service Manual.

The head support 12 and heads 13 and 14 are rotated by a conventional drive (not shown). The tape is advanced by a nip roller and capstan assembly 19 which is also driven by conventional means (not shown).

As is well known in the video recording art, equipment of the type shown in FIG. 1 records the video signal in a slant-track pattern on the video tape 15. By way of example, such a slant-track pattern for the video information is shown at 21 in FIG. 4.

In this type of video recorder, it is also customary to record signals for control purposes on the tape. This is typically done in a separate control track as shown, by way of example, at 23 in FIG. 4. A magnetic recording and playback head for recording and playing back control signals from the track 23 is shown at 24 in FIG. 1. One or more conventional recording and playback heads (not shown) may also be employed in accordance with standard practice for recording and reproducing audio signals onto and from one or more audio tracks 25.

Figures 7, 8, 9A, 9B, 9C, 10, 11, 12:
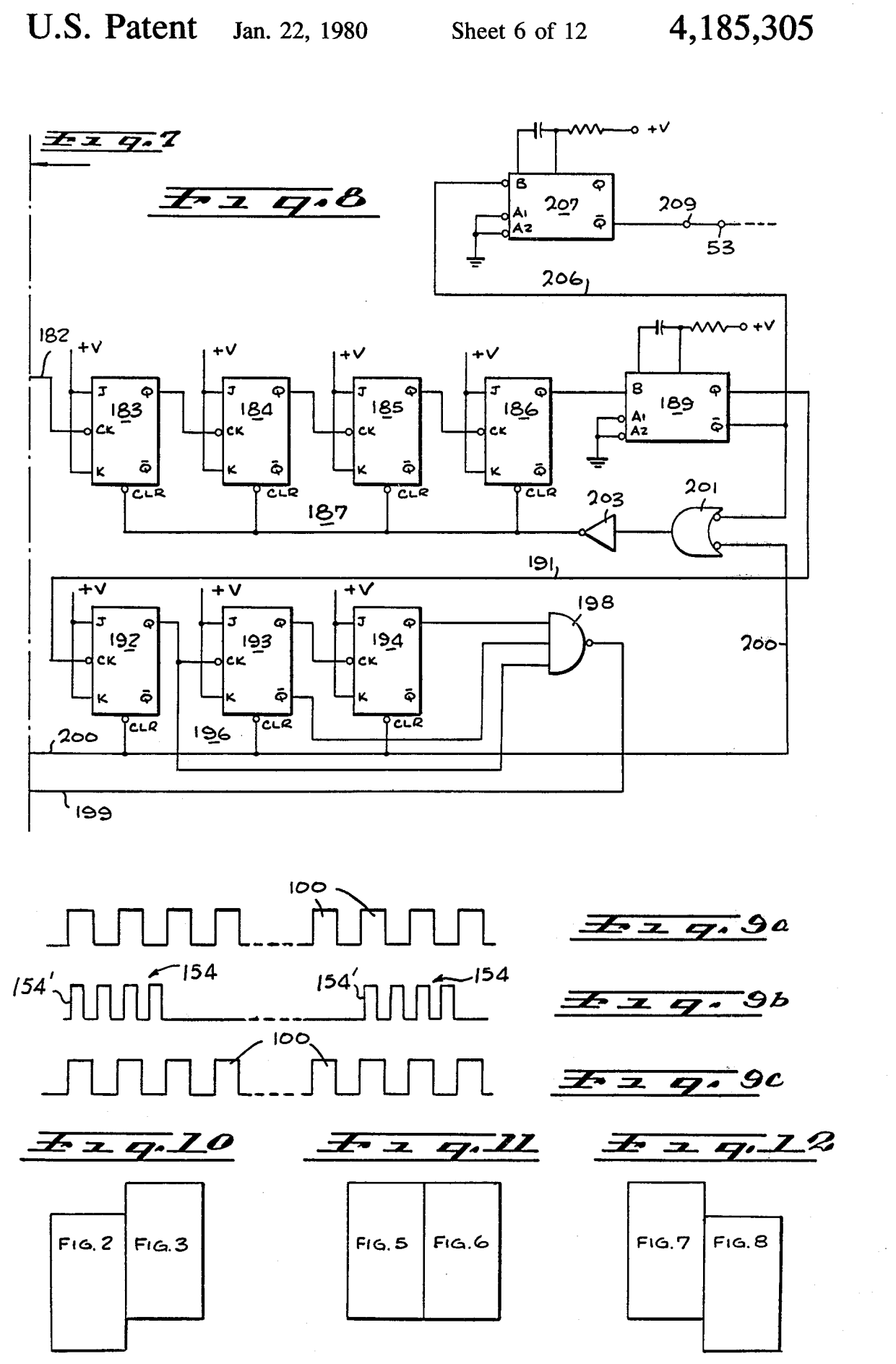

A representative type of servo control for the above mentioned type of video recording and playback equipment is shown by way of example in FIGS. 2 and 3 which should be juxtaposed as shown in FIG. 10. In this connection, reference may again be had to the above mentioned Service Manual or videocassette recorder.

By way of general comment, the recording and playback equipment herein under consideration employs a braking-type servo system to control the velocity of the video recording and playback head rotation. In addition to the control signal recording and playback head 24 shown in FIGS. 1 and 2, there are two further magnetic pickup devices 28 and 29 shown below the control signal head 24 in FIG. 2.

The devices 28 and 29 pick up the position of the video heads 13 and 14, respectively. These pickup devices are of a conventional type and, in a conventional manner, generate a pulse whenever they are passed by a magnetically active vane or other rotating conventional device (not shown) which is located on the rotating head assembly to indicate video head position.

Upon playback, the servo control shown in FIGS. 2 and 3 compares the control signals played back by the head 24 with the signals generated by the pickup devices 28 and 29. If this comparison indicates that the video head velocity is too high, the braking current in a conventional braking device 31 is increased so as to retard the video head position. On the other hand, the braking current is lessened in response to an indication that the video heads 13 and 14 lag the desired velocity.

In the recording mode, seprated sync signals obtained from the video signal serve as timing reference for the illustrated servo system.

In the servo control shown in FIGS. 2 and 3, a terminal 41, jumper 42 and terminal 43 connect the control signal head 24 to a preamplifier 45 including transistors 46, 47 and 48. The output pulses of the preamplifier 45 are applied via terminal 51, jumper 52 and terminal 53 to a lead 54.

When a tracking control switch 56 shown in FIG. 3 is in its off position, the output pulses of the preamplifier 45 are applied to a monostable multivibrator 57. These output pulses are also applied to a multivibrator 58 of a variable delay system that provides variable tracking. This variable delay system includes the multivibrator 58 and a multivibrator 59 connected in cascade. The RC network that determines the duration of the unstable state of the multivibrator 59 is returned to a variable bias source at a transistor 61, whose emitter voltage is controlled by a voltage divider that includes the variable resistor 62 of a tracking control.

In the on position of the tracking control switch 56, delayed played-back tracking control pulses are applied to the above mentioned multivibrator 59. This multivibrator generates a pulse to be formed into a sampling ramp in the succeeding stage. The multivibrator 57 is connected to a Miller integrator 63 that generates a negative-going ramp. The amplitude of this ramp is sampled by a sampling hold gate 64 which is turned on by a delayed pulse generated by the pickup device 28 upon each pass made by the video head 13. A capacitor 65 is charged to the value of the ramp and holds its charge until the next pulse is picked up.

In this manner, the voltage stored across the capacitors 65 is determined by instantaneous head position. If the video heads are early, the ramp is sampled at a higher amplitude and the voltage across the capacitor 65 increases. This, in turn, will result in increased braking current generated by a power amplifier 66 which includes transistors 67, 68 and 69 and which is connected to the sampling hold gate 64.

In the recording mode of the illustrated equipment, vertical sync signals derived from the video signal being recorded is applied via an input terminal 71 to trigger the multivibrator 56 of the ramp generator.

In the playback mode, the servo system reaches equilibrium when the video heads 13 and 14 track precisely over the prerecorded tracks 21 on the tape 15.

In the operation of the system, an amplifier 73 amplifies the delayed head position pulse to drive the sampling hold gate 64. The transistors 67 and 68 are connected in a Darlington configuration to prevent loading of the sampling hold capacitor 65. The transistor 69 provides the brake current.

The brake 31 may operate as a squirrel cage motor with a stationary field. An increase in the braking current acts to brake the rotor that is secured to the shaft of the rotory head drum assembly.

The pulses generated by the head position pickup 28 are amplified at 75 and are applied to a pair of delay multivibrators 76 and 77. The multivibrator 77 is set to place the delayed head position pulse at the correct position on the sampling ramp.

The latter position is adjusted with the aid of a variable resistor 81 which receives a variable voltage signal va a lead 82. The voltage of the latter signal is determined by a closed loop system that acts to integrate jitter in the playback control track pulses due to residual vow and flutter in the tape transport.

To this effect, a pulse is derived from the multivibrator 77 by a lead 83 and is integrated by a resistor 84 and a capacitor 85. The integrated pulse is applied as a steep ramp to a sampling hold gate 86. This gate is switched on by the control track pulse found at the input of the multivibrator 57.

In consequence, a capacitor 87 is charged and stores a direct-current signal proportional to control track pulse jitter. The capacitor 87 is quite large so that the jitter component is integrated over a long time interval.

The voltage across the capacitor 87 is buffered at 88 to control the delay of the head position indicating pulses in the multivibrator 77 via the lead 82. The requisite sampling hold pulse is amplified at 89.

In this manner, head position indicating pulses are delayed to coincide with the average position of the control track pulses and the effects of rapid jitter are minimized.

The head position pickup 29 is mounted 180° from the pickup 28 and serves to generate a pulse as the video head 14 enters the tape path. This pulse may be used in a conventional manner to trigger head switching equipment (not shown) and to generate the blanking pulse for a conventional dropout compensator (not shown).

To this end, the output of the pulse amplifier 91 is applied by a lead 92 to a delay and dropout compensator multivibrator 93 which controls video head switching and, at an output 94, generates a 60 Hz blanking pulse that disables the dropout compensator during the head switching interval. It will be noted that a lead 96 applies pulses derived from the pickup 28 to a second input of the multivibrator 93.

During recording, control signal pulses derived via a lead 98 are amplified by a recording amplifier 99 and are applied via the terminals 41 and 43 and jumper 42 to the control signal recording head 24 for magnetic recording in the control track 23 on the tape 15.

By way of example, in a servo system of the type so far described, control pulses 100 schematically shown in FIG. 4 are recorded in the track 23 at 33 ms intervals. Upon playback, the servo system needs the control pulses conforming to this standard in order to control the reproduction of the video information or signal from the tape 15 in a manner known per se.

A representative waveform illustrating the conventionally recorded and played back control signal pulses 100 is shown in FIG. 9a.

If several of the control pulses 100 are missing from the played back control signal, so that longer intervals occur between succeeding control pulses, conventional servo systems, such as the system described so far with reference to FIGS. 2 and 3, are not capable of controlling the reproduction of the video signal from the tape 15. Accordingly, the prior art always has carefully avoided any dropout of control signal pulses in the control signal as recorded and played back.

By fundamental contrast, the subject invention, for the purposes herein disclosed employs control signals which the prior art would have rejected as substandard.

According to the illustrated preferred embodiment of the subject invention, the jumper 42 shown in FIG. 2 is removed and the encoder shown in FIGS. 5 and 6 is inserted therefor during recording of the control signals by the control head 24.

As shown in FIG. 5, the encoder has an input terminal 102 connected to the terminal 43 shown also in FIG. 2. As shown in FIG. 6, the encoder has an output terminal 103 connected to the terminal 41 which, as shown in FIG. 2, is connected to the control signal recording head 24.

The input terminal of the encoder receives the control signal pulses 100 as generated by the servo system shown in FIGS. 2 and 3 and as amplified by the recording amplifier 99.

Pulse amplifiers 104 and 105 apply the control signal pulses 100 to an inverter 106 and an input 107 of a binary register 108.

The inverter 106 applies its output signal to the B input of a monostable multivibrator 110 to trigger the multivibrator into its time period and to lock out further input pulses during that time period.

The multivibrator 110 generates at its Q output a pulse whose duration corresponds to the prolonged pulse intervals that are desired in the generated substandard control signal. This pulse is applied to the B input of a monostable multivibrator 112 which generates a pulse of a given duration which typically is several times shorter than the duration of the pulse generated by the multivibrator 110.

The Q output pulse of the multivibrator 110 is also applied to the B input of a multivibrator 113 which, at its Q output, generates a narrow strobe pulse which is employed to clock the D-type edge-triggered flip-flop elements 115, 116 and 117 of the binary register 108.

The D inputs of the flip-flop elements 115 to 117 are connected by way of switches 121, 122 and 123 to the register input 107 to receive the generated and amplified control pulses 100.

More specifically, the switches 121 to 123 are double-throw switches which, in one position, connect the associated D input of the particular flip-flop to a positive potential and, in their other position, connect such D input to the pulse amplifier 105 which provides the generated and amplified control pulses 100.

The flip-flop elements 115, 116 and 117 generate one, two or four pulses for each strobe pulse depending on whether the switch 121, 122 or 123 is in a position to connect the corresponding flip-flop element to the input 107. Combinations of generated pulses may be provided by combining any two or all three switches 121 to 123.

The Q and $\overline{Q}$ outputs of the flip-flop elements 115 to 117 of the binary register 108 shown in FIG. 5 are connected to inputs of NAND elements 125 to 130 of a comparator 131. Other inputs of the NAND elements 125 to 130 of the comparator 131 are connected to a pulse counter 132 also shown in FIG. 6. A line 134 connects the Q output of the multivibrator 112 of the clock input of a J-K master-slave flip-flop element 135 of the pulse counter 132. Further J-K flip-flop elements 136 and 137 of the pulse counter 132 are clocked by the Q output of the preceding flip-flop element. The flip-flop elements 135 to 137 of the pulse counter 132 are cleared by the trailing edge of the Q output pulse of the multivibrator 110. That trailing edge also presets the flip-flop elements 115 to 117 of the binary register 108.

Q and $\overline{Q}$ outputs of the flip-flop elements 135 to 137 are connected to the NAND elements 125 to 130 of the comparator 131, as shown in FIG. 6. This comparator further includes three inverters 141, 142, and 143 connected to outputs of the NAND element 125 and 126, 127 and 128, and 129 and 130, respectively.

An inverter 145 has an input connected to the outputs of the inverters 141 to 143, and an output connected to an input of a NAND element 146. The other input of the NAND element 146 is connected to the Q output of a monostable multivibrator 148.

The multivibrator 148 has its B input connected to a source of positive potential, and its $A_1$ and $A_2$ inputs to the Q output of the multivibrator 112. The $\overline{Q}$ output of that multivibrator is connected via pulse shaper and voltage level amplifiers 151 and 152 to the output of the encoder shown in FIGS. 5 and 6 and hence to the terminal 41 shown in FIG. 2 at the control signal recording and playback head 24.

The playback amplifier 99 shown in FIG. 2 will apply a video head position indicating pulse 100 (see FIG. 9a) generated in the manner described above with reference to FIGS. 2 and 3, or generated in another conventional manner, to the terminal 43 and hence to the encoder input terminal 102 shown in FIG. 5. That pulse signal will be applied via the pulse amplifiers 104 and 105 to the input 107 of the binary register 108 and, further to the inverter 106 and to the B input of the multivibrator 110.

In response to such pulse, the binary register 108 will provide the comparator 131 with one or more pulses, the number of which is determined by the setting of the switches 121 to 123.

Further pulses 100 generated by the servo system and occurring during the time period of the multivibrator 110 are locked out by the multivibrator 110 and will thus not reach the output 103 of the encoder or otherwise influence its operation. The rising edge of the Q output pulse generated by the multivibrator 110 triggers the multivibrator 112 into generating output pulses which are applied via the lead 134 to the pulse counter 132. This pulse counter counts the pulses generated by the multivibrator 112.

The comparator 131 compares the pulses provided by the binary register 108 and the pulses counted by the pulse counter 132. Upon the determination of an identity of these two sets of pulses, the output of the NAND element 146 inhibits further generation of pulses by the multivibrator 112, provided the $\overline{Q}$ output of the multivibrator 148 permits such an inhibition at that time.

The pulses thus generated by the encoder shown in FIGS. 5 and 6 are illustrated at 154 in FIG. 9b. After the latter inhibition of the multivibrator 112 by the comparator 131, no further pulses will be provided at the encoder output 103 until the particular time period of the multivibrator 110 has expired. At that instant, the primary register 108 is preset and the pulse counter 132 is cleared by the trailing edge of the Q output pulse of the multivibrator 110.

The first video head position indicating pulse 100 occurring after the latter event will again trigger the multivibrator 110 and will repeat the pulse generating cycle just described with reference to FIGS. 5 and 6. A second series of pulses 154 is then generated by the encoder, as also indicated in FIG. 9b.

As mentioned above, the encoder shown in FIGS. 5 and 6 is connected between the terminals 43 and 41 in lieu of the jumper 42 in the servo system shown in FIGS. 2 and 3. In consequence, the control signal recording head 24 will not record the video head position indicating pulses 100 in the recording track 23 of the tape 15, but rather the substitute pulses 154, as indicated in a section of FIG. 4.

Within the intended scope of the subject invention, only one pulse 154 need be recorded in the control track 23 for each of the pulses 100 which is able to trigger the multivibrator 110 shown in FIG. 5. However, in accordance with a preferred embodiment of the subject invention, two or more pulses 154 are recorded in response to each such pulse 100. In practice, this helps to conceal the nature of the pulses 154, since it will give an unauthorized user or intended duplicator of the video recording the impression that he will need to build a control that responds to the several pulses 154 in the same group. In addition, the number of pulses 154 generated in each pulse group may be varied by changing the setting of the switches 121 to 123 shown in FIG. 5, whereby to provide for an identification of various tape recordings. Moreover, the several pulses 154 in each set of pulses 154 may be employed to help confuse the servo control of unauthorized playback equipment. For this purpose, the pulses 154 may be spaced differently than the pulses 100.

Of course, the subject invention does not exclude the utilization of all of the pulses in each group of pulses 154 in the control of the reproduction of the video recording from the tape 15.

The substitute control signals 154 are picked up by the control signal recording and playback head 24 upon playback of the tape 15 in the machine illustrated in FIG. 1. If the servo control of the playback apparatus is of a conventional type, it will not be able to control the playback of the video recording with the pulses 154. Rather, the servo control will drift off and provide either a garbled playback or, more typically, no displayable playback of the video signal at all. In this manner, unauthorized reproduction and/or unauthorized copying of the video recordings are inhibited, and further theft of video recordings is severely discouraged if not practically excluded in most instances.

Authorized duplication of the video recordings is, however, made possible by the techniques and equipment of the subject invention.

A decoder for regenerating the video head position indicating pulses 100 from the substitute pulses 154 played back by the control track head 24 is shown in FIGS. 7 and 8.

The decoder of FIGS. 7 and 8 is connected between the terminals 51 and 53 of the servo control shown in FIGS. 2 and 3 in lieu of the jumper 52. In particular, the decoder has an input terminal 161 connected to the output terminal 51 of the playback amplifier 45, so as to receive the played back substitute signals 154 from the control track 23 of the tape 15.

These played-back substitute control signals are applied to an input of a NOR element 162 which form part of a pulse latch 163.

The latch further includes a NOR element 164 interconnected with the NOR element 162 as shown in FIG. 7. The latch 163 is reset when the energizing power of the equipment is turned on. To this end, the NOR element 164 has a reset input connected to the output of an inverter 166. The input of that inverter is connected to the collector of a transistor 167. The transistor 167 is connected between ground 168 and a power supply line 169, in order to pull the input of the inverter 166 to ground when the power of the equipment has been turned on. To this end, the base of the transistor 167 is connected via a diode 171 to an RC network 172 connected between ground 168 and power lead 169 in order to introduce a predetermined delay in the operation of the transistor 167. A terminal 173 connects the power lead 169 to a source of direct-current power (not shown). A filter capacitor 174 is connected between the power lead 169 and ground. A terminal 176 connects the power lead 169 to the equipment to be energized in a conventional manner.

In response to a played-back substitute control pulse 154, the latch 163 triggers a monostable multivibrator 177 via a line 178. The multivibrator 177 and a multivibrator 179 are connected back to back and form a clock generator 181.

The latch 163 works only on the first pulse 154 of a group or cluster of played-back substitute control pulses. Accordingly, subsequent pulses in the same series or cluster are ignored by the decoder according to the illustrated preferred embodiment of the invention.

A line 182 applies the output of the clock 181 to the clock input of a J-K master-slave flip-flop element 183 which, together with other J-K flip-flop elements 184, 185 and 186, forms a clock divider counter 187.

Each of the flip-flop elements 184 to 186 has its clock input connected to the Q output of the preceding flip-flop elements.

In the illustrated preferred embodiment, the clock divider counter 187 applies an output pulse to the B input of a monostable multivibrator 189. This presupposes that there are eight clock pulse periods between the leading edge of a head position identifying pulse 100 coinciding with the first pulse 154' of a cluster of pulses 154 and the leading edge of the next pulse 100 coinciding with the first pulse 154' of the next cluster of pulses 154.

When the multivibrator 189 has been triggered by the Q output of the flip-flop element 186, it provides a clock signal via a line 191 to the clock input of a J-K master-slave flip-flop element 192. The flip-flop element 192 and further J-K flip-flop elements 193 and 194 provide a pseudo pulse counter 196.

From the point of view of the decoder, the pulses required to provide all the omitted pulses 100 from the position indicating signal are viewed as pseudo pulses, since they are, in accordance with the subject invention, not recorded in the control track, but have to be reconstructed upon playback from the recorded and reproduced substitute control pulses 154 or at least from predetermined ones of these substitute control pulses.

A NAND element 198 is connected to the flip-flop elements 192 to 194 of the pseudo pulse counter 196, in order to determine when the requisite number of pseudo head position indicating pulses has been regenerated by the decoder.

At that instant, the NAND element 198 provides in a line 199 a reset signal for the latch 163. Accordingly, the next arriving played-back substitute control pulse 154 is able to start a further pseudo pulse generation cycle, which proceeds in the same manner as the cycle just disclosed.

Clear signals for the flip-flop elements 192 to 194 are derived by a line 200 from the output of the NOR element 162 in the latch 163. These clear signals are applied to an input of a NOR element 201, the other input of which is connected to the $\bar{Q}$ output of the multivibrator 189. A clear signal for the flip-flop elements 183 to 186 is derived by an inverter 203 from the output of the NOR element 201.

As indicated above, the multivibrator 189 generates a pseudo pulse for each eight periods of the clock signal generated at 181.

A line 206 connects the Q output of the multivibrator 189 to the B input of a monostable multivibrator 207 employed for time period shaping purposes. Depending on the requisite phase of the reproduced head position pulses, either the Q output or the $\bar{Q}$ output of the multivibrator 207 is connected to the output 209 of the decoder.

The decoder output 209, in turn, is connected to the terminal 53 of the servo control shown in FIGS. 2 and 3, with the jumper 52 having been removed as mentioned above.

The waveform of the pulses appearing at the terminals 209 and 53 is illustrated in FIG. 9c. This waveform is the same as the waveform of the head position indicating pulses 100 originally generated in the servo system wherefore the pulses of the waveform of FIG. 9c are provided with the same reference numeral as the pulses of the waveform of FIG. 9a.

The reconstructed head position indicating pulses 100 shown in FIG. 9c are applied via the line 54 to the variable delay multivibrator 58 as if they had been played back from the control track 23 in a conventional video tape recording and playback system. The remainder of the operation of the servo control is thus the same as described above with reference to FIGS. 2 and 3.

Tests with prototypes of preferred embodiments of the subject invention have shown excellent performance of the methods and equipment of this invention.

In particular, no degradation or impairment of the recorded and reproduced video signals was noted when the techniques and equipment according to the subject invention were employed. On the other hand, reproduction and display of recorded video information deteriorated materially as head position indicating pulses 100 were omitted from the recorded control signal. Eventually, no video reproduction at al was possible. This typically occurred when some six position indicating pulses 100 were omitted.

Surprisingly, even an omission of that many head position indicating pulses in succession did not render impossible a perfect reproduction of the video information in accordance with the subject invention. This was very surprising, since it could not have been foreseen that severl pseudo pulses generated upon playback by a decoder in response to only one played-back control pulse at a time would be capable of sustaining the operation of the servo system. Rather, prior-art thinking would have indicated that the servo system needs a recording and reproduction of all or nearly all real head position indicating pulses for a perfect operation of the system. However, the subject invention and its practical manifestations disprove such prior-art belief.

Accordingly, the subject invention records the video information and first control information 154 on the recording tape 15. Upon playback, the video heads 13 and 14 and the servo control of FIGS. 2 and 3 reproduce the video information with the aid of second control information 100 (FIG. 9c) for controlling the reproduction of the video information from the recording medium.

The first control information 154 derived from the originally generated head position indicating pulses 100 (FIG. 9a) is rendered incapable as recorded of controlling the reproduction of the video information upon reproduction of the first control information 154. The requisite second control information 100 (FIG. 9c) is provided by reproducing the recorded first control information 154 from the control track 23 of the tape 15 and converting at least part of the reproduced first control information 154 to the second control information 100 (FIG. 9c).

As indicated above, the first control information 154 may be composed of a first part, such as the first pulse 154 in each pulse cluster, and a second part, such as the subsequent pulses 154 in each pulse cluster. Both these first and second parts of the control information 154 are recorded and are subsequently reproduced. However, in accordance with a preferred embodiment of the subject invention, only the first part of the reproduced first control information (such as only the first pulse 154 in each pulse cluster) is converted to the second control information 100 (FIG. 9c) for controlling the reproduction of the video information.

A further advantage of the methods and apparatus of the subject invention resides in the fact that they are implemented without introducing undue complexity into the recording and playback equipment, without rendering same unduly expensive and without introducing the risk of increased down time and service problems. Rather, commercially available standard shelf items may be employed in the implementation of the subject invention.

By way of example, the flip-flop elements 115, 116 and 117 may be of the type SN7474, shown and described, for instance in The Integrated Circuits Catalog for Design Engineers, First Edition CC-401, by Texas Instruments Incorporated, pp. 6-55 to 6-57. The J-K flip-flop elements 135 to 137, 183 to 186, and 192 to 194 may be of the type SN74107, shown, for instance, on pages 6-52 to 6-54 of the above mentioned Circuits Catalog.

The multivibrators 110, 112, 113, 148, 177, 179, 189 and 207 may be of the type SN74121 shown on pages 6-72 to 6-78 of the above mentioned Circuits Catalog.

The utility of the subject invention is not limited to video tape recording. Rather, it can be employed with video film recording, video disk recording and other forms of recording where a recorded signal is employed to control reproduction of the information from the recording medium.

Figure 13:
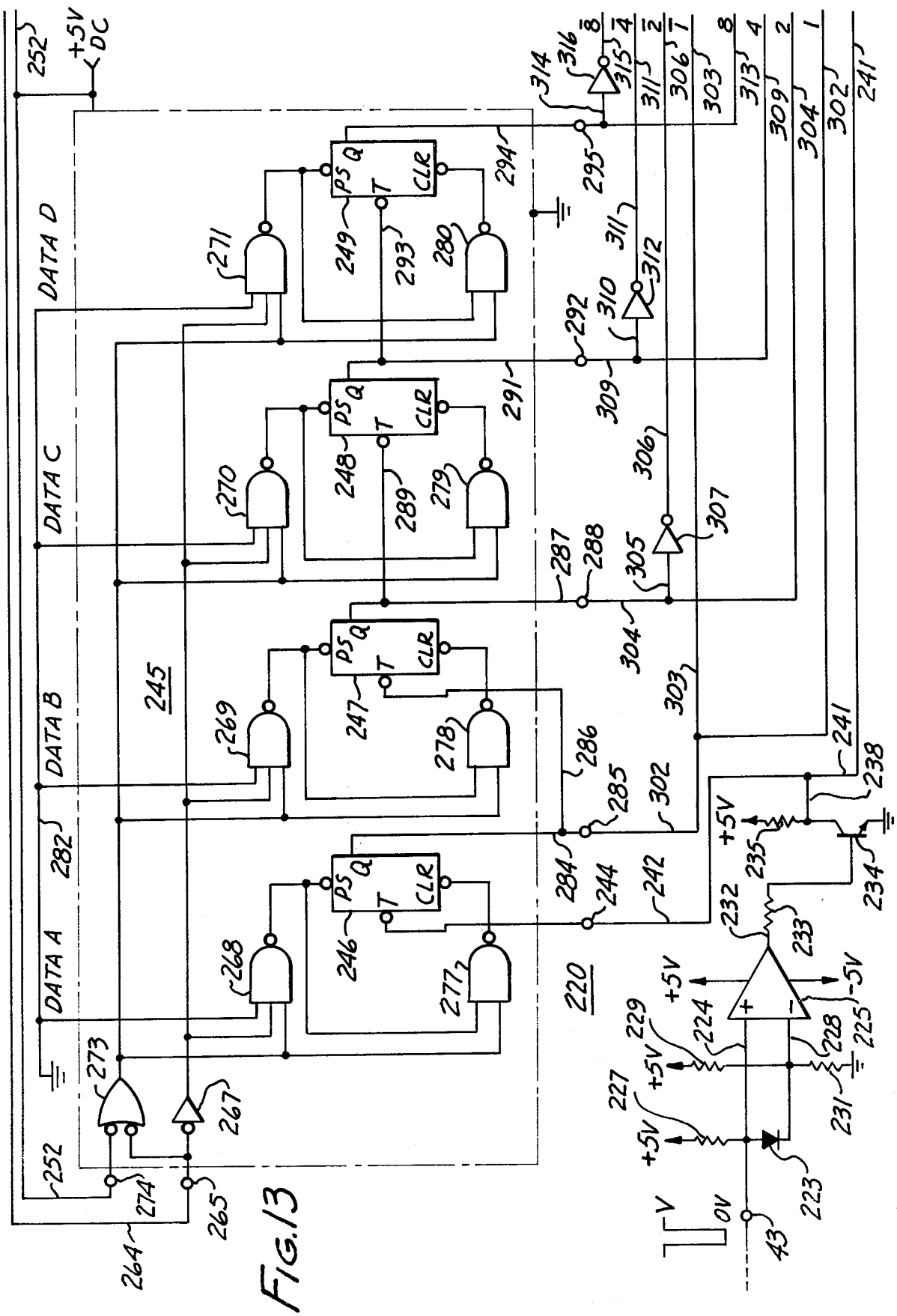

FIGS. 13 and 14 jointly show an improved encoder in accordance with a further preferred embodiment of the subject invention. This encoder may be employed in lieu of the encoder shown in FIGS. 5 and 6.

As before, the jumper 42 of the servo control equipment shown in FIGS. 2 and 3 is removed and the encoder of FIGS. 13 and 14 is inserted therefor between the terminals 41 and 43.

In particular, the encoder 220 shown in FIGS. 13 and 14 has an input 221 connected to the terminal 43 shown in FIG. 2.

The encoder 220 has an output 222 connected to the terminal 41 at the input of the recording head 24 shown in FIG. 2.

A diode 223 and the non-inverting input 224 of an operational amplifier 225 are connected to the input 221 of the encoder 220. A positive potential from a power supply (not shown) is applied via a resistor 227 to the diode 223 and non-inverting input 224. The diode 223, in turn, is connected to the inverting input 228 of the operational amplifier 225. A voltage divider comprising resistors 229 and 231 applies a positive bias potential to the inverting input 228 of the operational amplifier 225.

During recording, the above mentioned control signal pulses derived via the lead 98 shown in FIG. 2 are amplified at 99 and are applied via the terminal 43 to the encoder input 221 shown in FIG. 13. The operational amplifier 225 then performs a preamplifier operation on these negative polarity control pulses, which permit direct coupling of the coder with the recorder circuits and performs a straightening of the falling and rising edges of each pulse. By way of example, the operational amplifier 225 may be of the type SN72741, described on pages 4-67 to 4-71 in the Linear and Interface Circuits Data Book (1973) No. CC-415, by Texas Instruments Incorporated.

With an amplifier of the latter type, the amplifier output 232 switches from +5 volts to −5 volts when the falling edge of a control pulse reaches +3.5 volts on its way to ground level.

A resistor 233 connects the amplifier output 232 to the base of a transistor 234.

In response to an input signal of zero volts at the input terminal 43, the output of the operational amplifier 225 becomes −0.5 volts, which back biases and turns off transistor 234. The collector of the transistor 234 thereby rises to +5 volts, partially enabling the gate 320 (see FIG. 14) via line 241.

When the rising edge of the illustrated input pulse at 43 reaches +3.5 volts, it becomes clamped at 0.5 volts above the reference voltage applied by the voltage divider 229 and 231, and causes the output 232 of the amplifier 225 to switch from −0.5 volts to +5 volts. This forward biases the base of the transistor 234; the base current being limited by the resistor 233. The transistor 234 is thus turned on, causing its collector voltage to fall to ground level. Resistor 235 limits the current flow through transistor 234 to ground.

The resulting falling waveform at 238 and lines 241 and 242 connected thereto operates, respectively, to inhibit the gate 320 shown in FIG. 14, and, via terminal 244, to trigger a flip-flop stage 246 to switch states.

The flip-flop stage 246 is part of a presettable counter 245 which, for instance, may comprise an integrated circuit of the type SN74197 described, for example, on pages 9-29 to 9-34 of the above mentioned Circuits Catalog.

By way of example, the counter 245 is a four stage bianary counter including master-slave flip-flop stages 246, 247, 248 and 249. In accordance with conventional practice, each flip-flop stage has a preset input designated "PS", a clearing input designated "CLR", a trigger input designated "T", and a Q output.

In order to reset the counter 245 to the logic 0 state, the encoder 220 has a power on reset and clear gate circuit 251 shown in FIG. 14. A line 252 connects the input 253 of the circuit 251 to the positive terminal of the power supply (not shown). A resistor 255 and capacitor 256 are connected in series between the input terminal 253 and ground. Similarly, a resistor 257 and an NPN transistor 258 are connected in series between the input terminal 253 and ground as shown FIG. 14. A diode 259 connects the junction between the resistor 255 and capacitor 256 to the base of the transistor 258.

When the power supply of the encoder 220 is switched on, the capacitor 256 temporarlily acts as a short circuit and prevents the transistor 258 from turning on. The collector of the transistor 258 thus remains at +5 volts. This voltage level is passed through an inverter 261 to an input of a NAND gate used as a NOR gate 262 which, together with an inverter 263, forms the clear gate portion of the circuit 251.

The output of the inverter 263 at that instant is ground level and is applied via a line 264 to the clear input 265 of the counter 245 to reset all Q outputs of the counter stages 246 to 249 to the logic 0 state.

In terms of internal structure, the counter 245 has the clear input 265 connected via a converter 267 to a first input of each of a series of NAND elements 268, 269, 270 and 271. A NOR gate 273 has one input connected to the clear input 265 and another input connected to a count/load input 274 of the counter 245. In the illustrated preferred embodiment, the count/load input is connected to the positive power supply line 252. The output of the NOR gate 273 is connected to a second input of each of the NAND elements 268 to 271 and to a first input of each of a series of NAND elements 277, 278, 279 and 280. A second input of each NAND element 277 to 280 is connected to the output of a corresponding NAND element 268, 269, 270 and 271. Third inputs of the NAND elements 268 to 271 are strapped to ground via a line 282.

Each output of the NAND element 268 to 271 is connected to the preset or PS input of the corresponding flip-flop element 246, 247, 248 or 249. Similarly, each output of the NAND elements 277 to 280 is connected to the clear or CLR input of the corresponding flip-flop element as shown in FIG. 13. By operation of these elements, in conjunction with the circuit 251, the counter stages are reset whenever power is turned on and, as will be more fully described below, also preliminary to each counting operation.

The preamplified servo control pulses appearing at the counter input 244 are applied directly to the trigger input of the counter stage 246, so as to increment the counter 245. To this end, each Q output of a counter stage 246, 247 or 248 is connected to the trigger input of the next succeeding counter stage 247, 248 or 249, as shown in FIG. 13. In particular, a line 284 connects the Q output of the flip-flop element 246 to a counter output 285 having a decimal weight of "1". A line 286 connects the Q output of the flip-flop element 246 also to the trigger input of the flip-flop element 247.

Similarly, a line 287 connects the Q output of the flip-flop element 247 to a counter output 288 having a decimal weight of "2", while a line 289 also connects the Q output of the flip-flop element 247 to the trigger input of the flip-flop element 248.

A line 291 connects the Q output of the flip-flop element 248 to a counter output 292 which has a decimal weight of "4", while a line 293 connects the Q output of the flip-flop element 248 also to the trigger input of the flip-flop element 249. Finally, a line 294 connects the Q output of the flip-flop element 249 to a counter output 295 which has a decimal weight of "8".

The counter 245 will issue fifteen different binary states representing decimal numbers from 0 to 15. In particular, the counter 245 scales down the preamplified control signal pulses by a factor of 15.

To this end, a count decode circuit 300 shown in FIG. 14 is connected to the output of the counter 245 shown in FIG. 13. The count decode circuit 300 has a NAND element 301 having a first input connected to the counter output 285 via lines 302 and 303.

A second input of the NAND element 301 is connected to the counter output 288 via lines 304, 305 and 306 and an inverter 307. A third input of the NAND element 301 is connected to the counter output 392 via leads 309, 310 and 311 and an inverter 312. A fourth input of the NAND element 301 is connected to the counter output 295 via lines 313, 314 and 315 and an inverter 316.

In other words, the "1" output and the inverted "2", "4", and "8" outputs are applied to the gate 301. When the counter 245 issues a decimal number of "1" (binary 1, 0, 0, 0), the output of the gate 301 at a lead 318 goes to ground level and an inverter 319 thereupon applies a +5 volt level to a first input of a NAND element 321, constituting a decode output gate. A second input of the gate 320 is connected via the line 241 to the output 238 of the preamplifier shown in FIG. 13. When that output is also at the +5 volt level, the gate 320 is enabled and its output goes to ground level. This level is maintained during the input pulse time.

The gate 320 feeds an output driver 322 having a PNP transistor 323 and an NPN transistor 324 connected as shown in FIG. 14.

The transistor 323 turns on when a ground potential is applied to its base via a diode 326 connected to the output of the decode output gate 320 and a resistor 327 connected between the diode 326 and the base of the transistor 323. The collector of the transistor 323 thereby goes to the +5 volt level, which turns on the transistor 324 and causes its collector to go to ground level. This switching transition couples through a capacitor 328 and a resistor 329 to present at the output 222 of the encoder 220 and thus at the terminal 41 of the servo control equipment shown in FIGS. 2 and 3 a negative differentiated pulse. The control signal recording head 24 shown in FIG. 2 records this pulse in the control track 23 of the magnetic recording tape 15 (see FIG. 4).

It may be helpful at this juncture to note by way of example that the counter 245 may be of the type Ser. No. 74197, shown, for instance, on pages 451 to 453 of the TTL Data Book (1973), CC-411, by Texas Instruments Incorporated.

Reverting now to the description of the output driver 322, the diode 326 becomes back biased when the output voltage of the gate 320 moves to a +5 volt level. This turns off the transistors 323 and 324 whereby the collector of the transistor 324 moves from ground level to +5 volt. This switching transition couples through capacitor 328 and resistor 329 to provide a positive differentiated pulse at the output 22.

This pulse may be applied via the terminal 41 shown in FIGS. 2 and 14 to the recording head 24 and may be recorded in the control track in addition to the previously described negative differentiated pulse. Alternatively, either of these positive and negative differentiated pulses may be removed, such as by a diode or other suitable means (not shown) and only the remaining pulse may then be recorded. In the further alternative, the capacitor 328 may be given a high value, such as 10 μF, so that effectively the entire pulse between the leading and trailing edges of the preamplified pulse applied at counter input 244 is passed to the control signal recording head 24 to be recorded in the control signal recording track on the magnetic tape.

In the latter case, the preamplified control pulse received at the count "1" of the counter 245 is processed and recorded in the control signal recording track, and no other pulses of the set of 15 pulses to which the particular recorded pulse belongs is recorded in the control signal recording track.

A NAND element 332 acts as a repeat gate to detect when the counter 245 is issuing a decimal number 15 (binary 1, 1, 1, 1) in order to provide for a repeat operation of the encoder 222. To this end, the inputs of the repeat gate 332 are connected to the counter outputs 285, 288, 292 and 295 via leads 302, 304, 309 and 313, as shown in FIGS. 13 and 14. A line 333 connects the output of the repeat gate 332 to an input of the clear gate NOR element 262 in the circuit 251 in order to clear all stages of the counter 245 via the clear input 265 in the general manner described above.

This resets the counter at the end of the fifteenth pulse received from the servo control via the preamplifier 225.

When the counter 245 is being cleared, its outputs 285, 288, 292 and 295 go to ground level, which causes the output of the repeat gate 332 and thus the line 333 to go to a +5 volt level. In response, the clear gate 262 removes the clear condition from the counter 245 and permits recycling of the counter in the next counting operation. In this manner, every fifteenth control pulse is recorded by the head 24 in the control signal track. In principle, the control signal pulse that is recorded could be picked at any count of the counter 245, and the recording of the pulse occurring at count "1" is only presented herein by way of example.

In general terms, the encoder 220 encodes the control signal by scaling down by a predetermined factor the number of control pulses generated by the tape recorder servo control and by recording that scaled down number in lieu of the original number.

The scale down factor is chosen high enough so that a standard tape recorder receiving the scaled down pulses after playback thereof from the control signal track of the tape will not be able to synchronize its operation and to provide an acceptable video image display.

For a further description of the effects of the encoder 220, reference may be had to the above disclosure of the purpose and function of the encoder, including the encoder shown in FIGS. 5 and 6.

FIGS. 15, 16, 17 and 18 jointly show an improved decoder in accordance with a further preferred embodiment of the subject invention. This decoder may be employed in lieu of the decoder shown in FIGS. 7 and 8.

As before, the jumper 52 of the servo control equipment shown in FIGS. 2 and 3 is removed and the decoder of FIGS. 15 to 18 is inserted therefor between the terminals 51 and 53.

In particular, the decoder 350 shown in FIGS. 15 to 18 has an input 351 connected to the terminal 51 shown in FIG. 2, and an output 353 connected to the terminal 53, also shown in FIG. 2. In principle, the decoder 350 may be employed in conjunction with either of the encoders herein disclosed. The subject disclosure of the decoder 350 is, however, styled in terms of a decoding of reported and played-back pulses produced by the encoder 220 shown in FIGS. 13 and 14.

Typically, the latter pulses are applied by the encoder 220 to the terminal 41 shown in FIG. 2 and are recorded in the recording track of the tape by the control signal recording and reproducing head 24. During playback of the recording tape, the head 24 picks up these encoded control signal pulses and applied them to the terminal 41. These played-back encoded pulses proceed via the jumper 41 and amplifier input terminal 43 to be amplified by the preamplifier and to be applied via the terminal 41 to the input 351 of the encoder 350 (see FIGS. 2 and 15).

The task of the decoder 350 then is to convert these encoded pulses to a pulse train capable of controlling the playback function of the video recording and playback equipment via the terminal 53, lead 54 and the circuits connected thereto as shown in FIGS. 2 and 3.

The specific decoder 350 shown in FIGS. 15 to 18 is capable of accepting control pulses from a control signal track from which these pulses are reproduced at a rate of one pulse every 499.9 milliseconds. The decoder 350 will process these pulses into a multiple number of 15 to 1 and phase position them automatically. The output pulse rate at the output 353 of the decoder 350 is one pulse every 33.33 milliseconds. In practice, this permits an excellent control and high-quality operation of the above mentioned video recording and playback equipment. Of course, it will be understood that all specific values and numbers herein mentioned are of an examplary type, and that other pulse rates can be realized on the basis of the subject extensive disclosure.

In general terms, it has been found that not only the pulse rate decoding function, but also the phase position function of the decoder, can be quite important with the type of equipment under consideration and for the achievement of a truly excellent video image display.

By way of further general background, a prototype of the decoder 350 herein disclosed has been capable of tolerating any variation of the played-back control pulse rate up to a value of ±1.75%.

This variation is handled in the multiplying and phase positioning sections of the decoder presently to be described, so that the output pulse rate is automatically adjusted. Moreover, the decoder can also accept unencoded control signal pulse from a normal video tape or recording. The decoder automatically senses the rate of the pulses received at the input 351 and routes these pulses to the output 352 when they occur at the normal, unencoded rate. The pulse output from the multiplying and phase positioning sections are inhibited for this condition.

Figure 15:
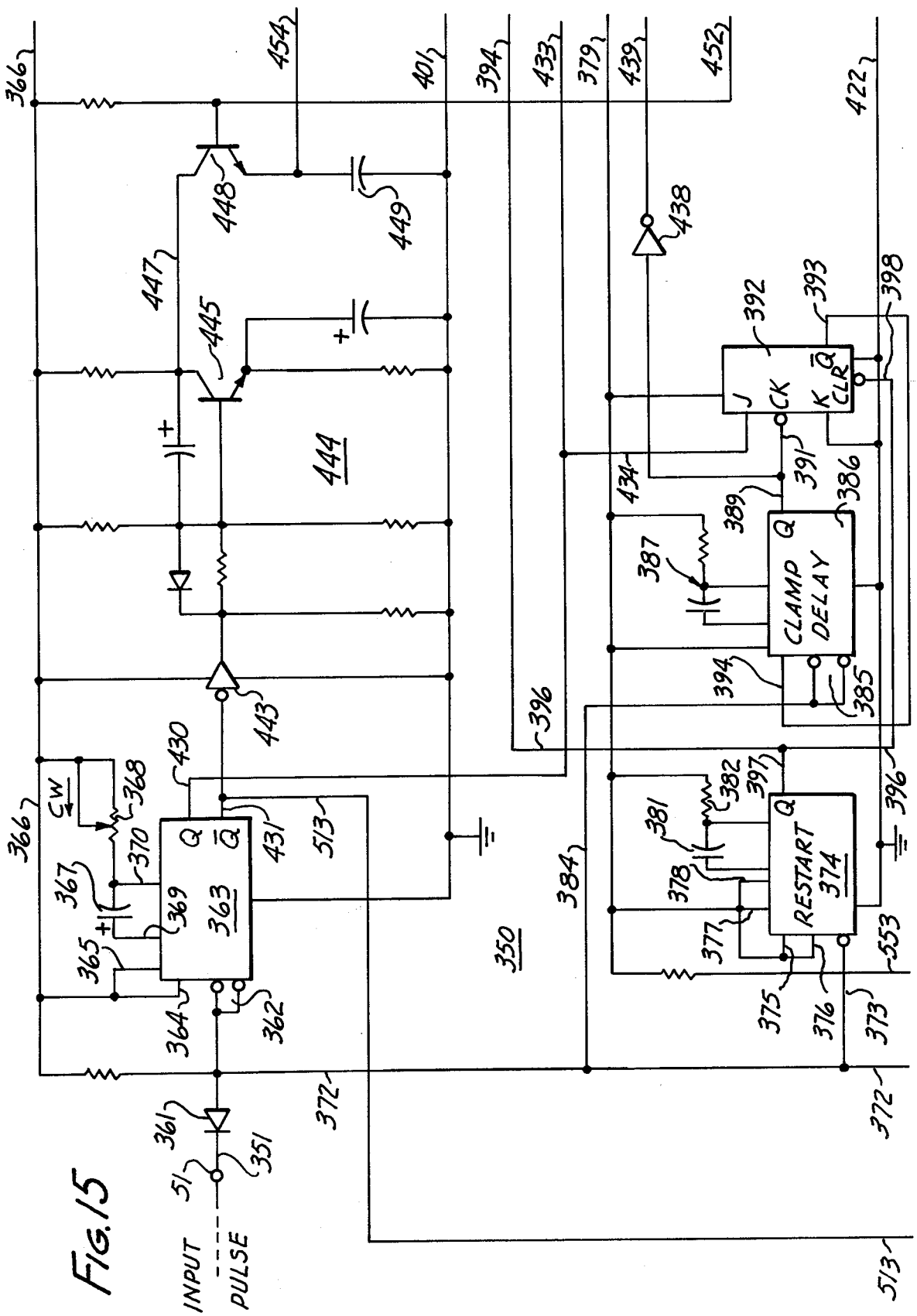
Figure 16:
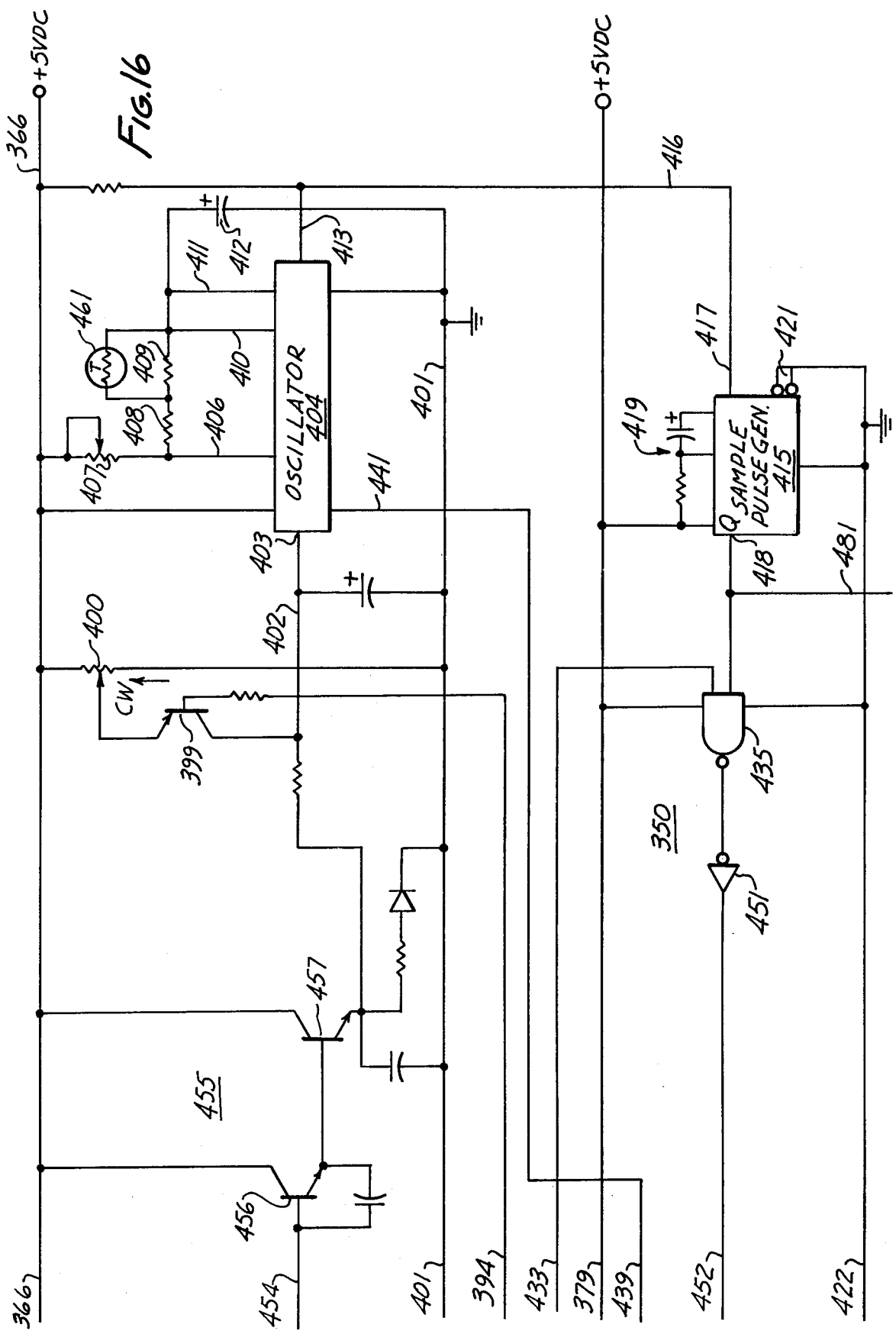
Figure 17:
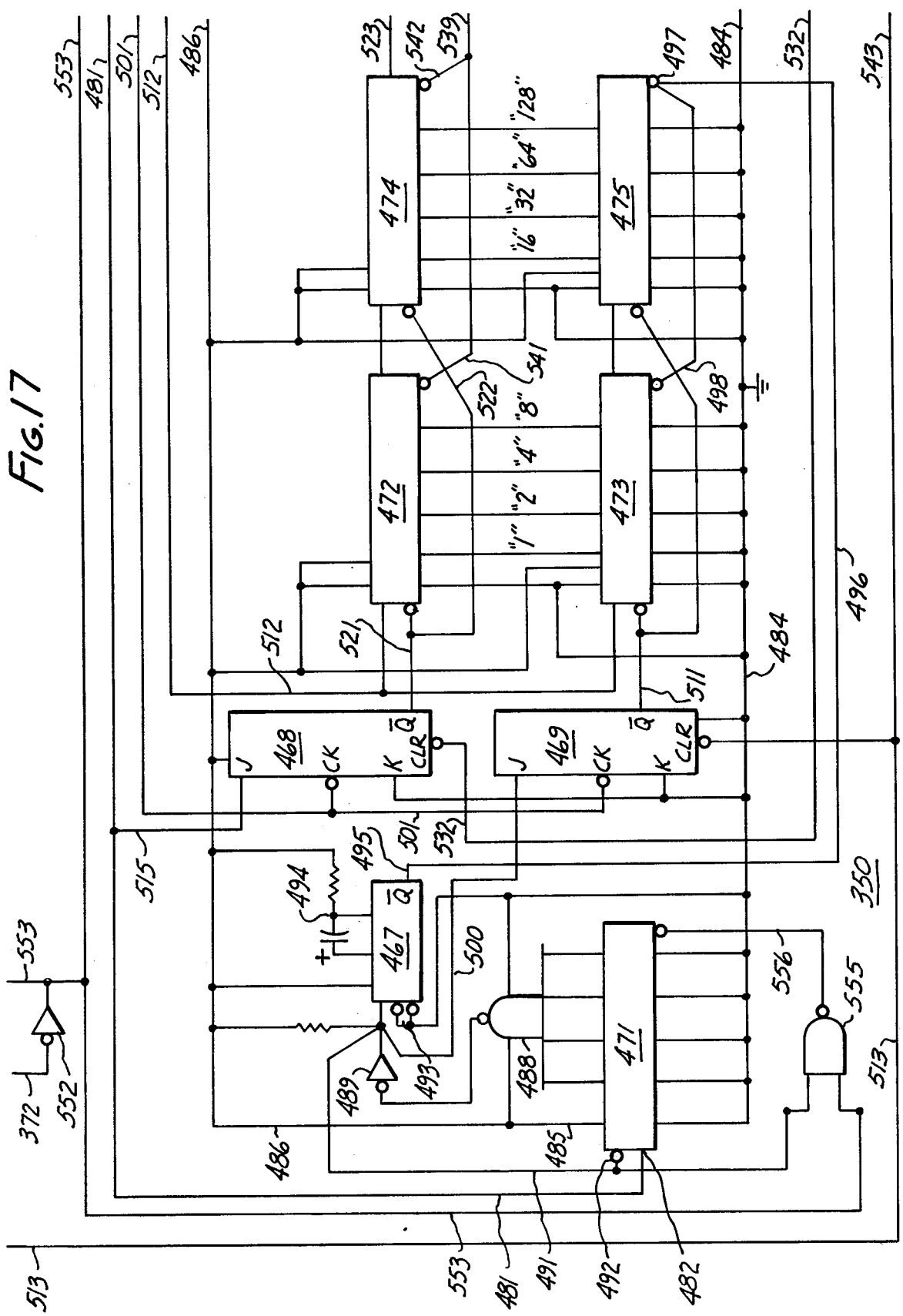

Turning now specifically to the circuitry of the decoder 350, it will be noted in the further course of this disclosure that the part of the decoder shown in FIGS. 15 and 16 may be thought of as a frequency multiplier which reverses the scaling down process of the encoder 220 shown in FIGS. 13 and 14, and that the part of the decoder 350 shown in FIGS. 17 and 18 may be considered a pulse phase positioning circuit which restores the recorded, played-back and decoded control signal pulses to their proper phase position as needed by the servo control for a perfect display of the reproduced video images or program. As seen in FIG. 15, the input 351 of the decoder 350 is connected via a diode 361 to a pair of negative-edge-triggered logic inputs 362 of a monostable multivibrator 363 which, by way of example, may be of the type Ser. No. 74121 shown, for instance, at pages 6-72 to 6-78 of The Integrated Circuits Catalog for Design Engineers, Third Edition, CC-401, by Texas Instruments Incorporated.

A positive Schmitt-trigger input 364 and the positive supply voltage input 365 are connected to a positive supply voltage bus 366. A timing network including a capacitor 367 and a variable resistor 368 is connected between the bus 366 and timing inputs 369 and 370 (which, for instance, may be the pins 10 and 11 of an Ser. No. 74121) of the multivibrator 363.

According to FIG. 15, the decoder input 351 is also connected via the diode 361 and a lead 372 to an inverting input 373 of a retriggerable monostable multivibrator 374 which, by way of example, may be of the type Ser. No. 74123, described on pages 6-79 to 6-83 of the above mentioned catalog CC-401. By way of example, the input 373 may be the pin 1 of the latter type Ser. No. 74123.

Another input 375, the clear inputs 376 and 377 and the positive voltage supply input 378 of the multivibrator 374 are connected to a positive voltage supply bus 379. By way of example, the inputs 375, 376, 377 and 378 may, respectively, correspond to the pins 2, 3, 11, and 16. A timing network including a capacitor 381 and a resistor 382 may be connected to timing input, such as pins 14 and 15, respectively, of the Ser. No. 74123.

A decoder input 361 is also connected via the diode 361, the lead 372, and a lead 384 to two negative-edge triggered logic inputs 385 of a monostable multivibrator 386 which, for instance, may be of the same type as the previously identified multivibrator 363.

A timing network 387 is connected to timing inputs of the multivibrator 386 in similarlity to the previously mentioned timing network connected to the multivibrator 363.

The Q output 389 of the multivibrator 386 is connected to the clock input 391 of a J-K master-slave flip-flop element 392 which, by way of example, may be of the type Ser. No. 74107 described, for instance, on pages 6-52 to 6-54 of the above mentioned Catalog CC-401. The $\overline{Q}$ 393 of the flip-flop element 392 is connected to a positive Schmitt-trigger input 394 of the multivibrator 386. A lead 396 connects the Q output 397 of the multivibrator 374 to the clear input 398 of the flip-flop element 392.

The lead 396, extending from FIG. 15 to FIG. 16, connects the Q output 397 of the multivibrator 374 also to the base of a PNP transistor 399. The emitter of the transistor is connected to a variable voltage divider or potentiometer 400 which, in turn, is connected between the positive voltage bus 366 and ground 401. The collector of the transistor 399 is connected via a lead 402 to the control voltage input 403 of a voltage controlled oscillator (VCO) 404. By way of example, the VCO 404 may comprise an integrated circuit timer of the type NE555, such as is described on pages 6-49 to 6-55 of the book entitled "Signetics Digital Linear MOS, WESCO" (1972) by Signetics Corporation.

The discharge terminal 406 (e.g. pin 7 of the type NE555) is connected via an adjustable resistor 407 to the positive voltage supply bus 366. A pair of resistors 408 and 409 are connected between the terminal 406 and the treshold input 410 and trigger input 411 (e.g. pins 6 and 2, NE555) of the VCO 404.

A capacitor 412 is connected between the inputs 410 and 411 and ground 401.

With the +5 volt DC power applied to the decoder 350, but no played-back control pulses appearing at the input 351, the Q output 397 of the multivibrator 374 goes to ground level. This turns on the transistor 399 via the lead 396 and its base. The turned on transistor 399 applies a DC voltage to the VCO input 403 via the adjustable resistor 404 and the lead 402. The voltage thus applied by the turned on transistor 399 is initially adjusted so that the VCO 404 will then oscillate at a frequency of, say, 30 Hz (Time period equal 33.33 milliseconds).

By way of example, the waveform at the output 413 may be rectangular with approximately ⅔ of a cycle being high and ⅓ being low. Each rising edge of this waveform operates so trigger a monostable multivibrator 415 via a lead 416 and a positive Schmitt-trigger input 417 to produce a pulse of 120 microseconds.

The multivibrator 415 may be of the same type as the multivibrator 386 and has a timing network 419 similar to the timing network 387 associated therewith, except that the components of the timing network 419 are selected to provide the desired 120 microsecond pulse at the output 418. Negative-edge triggered logic inputs 421 of the multivibrator 415 are clamped to a ground bus 422. The multivibrator 415 may be viewed as a sample pulse generator as its output pulses are employed for sampling purposes and to drive the phase position circuitry as more fully described below.

The multivibrator 374 is of a retriggerable one shot type having a timing cycle greater than the rate of the played-back encoded control signal pulses received at the encoder input 351. In other words, the timing cycle is longer than the duration between adjacent pulses in the played-back encoded control signal. By way of example, a prototype of the encoder 350 employed a multivibrator 374 which had a timing cycle of 1.5 times the encoded input pulse rate. Accordingly, the played-back encoded input pulses continually retrigger the multivibrator 374 and the Q output 397 remains high to turn off the transistor 399 via the lead 396.

The encoder 350 according to the illustrated preferred embodiment has its own automatic drop out detector and corrector. In particular, the signal appearing at the multivibrator input 373 will no longer be able to retrigger the multivibrator 374 within its timing cycle if one or more input pulses are missing from the played-back control signal. Rather, the Q output 397 of the multivibrator 374 will drop after the timing cycle (e.g. 750 milliseconds) and turn on the transistor 399. As mentioned above, this causes the VCO 404 to provide an output signal at the output 413 and via the lead 416 of a frequency of 30 Hz in the context of the above mentioned example. This automatically causes the encoder to operate at a fixed frequency rate, which is preferably close to the normal operating rate to minimize hunting and shorten response time for locking on to the reappearing input pulses.

It is thus seen that the multivibrator 374 and transistor 399 form a drop out detector which automatically causes the VCO 404 and the remainder of the encoder 350 to operate at a fixed frequency rate.

The normal operation of the frequency multiplication portion of the encoder 350 shown in FIGS. 15 and 16 will now be considered.

In particular, any played-back control signal pulse triggers the one shot multivibrator 363 via the input 351, diode 361 and multivibrator inputs 362. The multivibrator 363 stretches the input pulse to a fixed value of, say, 25 milliseconds in our example. The Q output 430 thereby issues a +5 volt pulse while the $\overline{Q}$ output 431 of the multivibrator 363 issues a complementary ground level pulse.

The Q output pulse of the multivibrator 363 is applied via leads 433 and 434 as a set function to the J input of the J-K flip-flop element 392. The Q output pulse of the multivibrator 363 also proceeds via the lead 433 to activate a NAND gate 435 shown in FIG. 16.

While an input control pulse is triggering the one shot multivibrator 363, it also triggers the one shot multivibrator 386 via lead 372 and 384 to generate a 10 millisecond pulse at the Q output 389 which is applied to the clock input 391 of the flip-flop element 392 where its fall edge is employed to clock the flip-flop element. Since the multivibrator 363 is then supplying a set function to the J input, the flip-flop element 392 is toggled to a set state.

The $\overline{Q}$ output 393 of the flip-flop element 392 thereby goes to a low level which is fed back to the input 394 of the multivibrator 386 to lock out that multivibrator from being triggered from other successive input control pulses. This lock out prevents the multivibrator 374 from turning on the transistor 399 unless a loss of one or more pulses in the played-back control signal occurs.

The Q output pulse of the multivibrator 386 is applied via the multivibrator output 389, an inverter 438 and a lead 439 to the reset input 441 of the VCO 404 shown in FIG. 16, causing that VCO to reset. At the end of the output pulse of the multivibrator 386 (e.g. at the end of 10 milliseconds) reset is removed and the VCO 404 will restart its oscillation. This action aligns the operation of the VCO 404 with a voltage ramp, being generated so that a sample pulse will be assured to fall on the ramp.

By way of example, the output pulses of the multivibrator 363 may have a length of 25 milliseconds each. In particular, the $\overline{Q}$ output 431 of the multivibrator 363 is inverted by an inverter 443 which thereupon applies a +5 volt level to a Miller integrator circuit 444 including an NPN transistor 445.

The Miller integrator circuit 444 thereby produced a linear voltage ramp at the collector of the transistor 445. This ramp starts from a +5 volt level and slopes toward ground. The rate of change of voltage of this ramp per unit of time (dv/dt) is preferably identical to the volt per frequency (dv/df) characteristic of the VCO 404.

A lead 447 connects the collector of the transistor 445 to the collector of an NPN transistor 448 which forms a sampling gate. When turned on, the transistor 448 saturates and the ramp voltage occurring at that instant is transferred to a capacitor 449. When the transistor 448 is turned off, the capacitor 449 will retain the sampled ramp voltage until the transistor 448 is again turned on.

The sample time period, which may, for instance, be 10 microseconds, is supplied by the multivibrator 415. The NAND gate 435 receives each sampling pulse from the sampling pulse generator output 415 and passes that sampling pulse only during the time period in which the lead 433 applies to the gate 435 the Q output pulse of the multivibrator 363 shown in FIG. 15. By way of example, the duration of each Q output pulse of the multivibrator 363 may be 25 milliseconds.

The gated sampling pulses are applied via an inverter 451 and lead 452 to the base of the transistor 448, causing that transistor to turn on for a sampling function. Assuming the above mentioned time values, sampling thus takes place once every 499.9 milliseconds.

The low impedance of the turned on, saturated transistor 448 permits rapid changes in the voltage stored in the capacitor 449. However, when the rate of the played-back or input pulses agrees with the rate of the multiplied oscillator frequency, voltages sampled from the ramp will take on a near constant value and produce an essentially steady DC voltage.

The sampled voltage across the capacitor 449 is applied by a lead 454 to a high impedance Darlington circuit 455 including transistors 456 and 457. This Darlington circuit prevents undesirable leakage of the stored voltage across the capacitor 449 between sampling periods.

The emitter of the transistor 457 supplies the lead 405 and thus the control voltage input 403 of the VCO 404 with a voltage level proportional to the stored value across the capacitor 449. This voltage level controls the frequency of the VCO 404 which, in our example, is equal to 15 times that of the played-back encoded control signal pulses. The sampling process just described maintains this frequency and an automatic correction is effected, in our example every 499.9 milliseconds, for any change in input frequency rate.

In operation, the transistor 399 overrides the capacitor 449 as a frequency controlling element when the transistor 399 has been turned on by the Q output of the multivibrator 374 in response to a dropout of one or more control signal pulses from the played-back control signal pulse train. The same output pulse of the multivibrator 379 which turns on the transistor 399 operates via the lead 396 to reset the flip-flop element 392 and to remove its lock out action on the one shot multivibrator 386.

When the played-back control signal pulses resume, the multivibrator 374 restarts its timing cycle and its output 397 turns off the transistor 399, whereupon the sampled voltage across the capacitor 449 resumes its frequency controlling function described above.

At the completion of a reset pulse received at the input 441, the VCO 404 will restart and immediately generate a rising edge that triggers the sample pulse generator 415. The resulting sampling pulse turns on the transistor 448 to obtain a voltage from the ramp as described above. This method of response insures that the VCO 404 is driven by a DC voltage corresponding closely to the incoming pulse rate. The "homing" of the DC voltage to its proper value thus requires only 3 to 4 sample time periods or only approximately 1.5 to 2 seconds of time. In this connection, it may be noted that the voltage/frequency characteristic of the VCO 404 is such that the frequency at the output 413 will increase if the controlling DC voltage decreases, while an increase in that voltage leads to a decrease in the oscillater frequency.

The phase positioning circuit part shown in FIGS. 17 and 18 of the encoder 350 has the important object of restoring a desired phase relationship of the decoded control signal pulses so that the phase relationship of the decoded control signal pulses relative to a video signal playback function corresponds to the phase relationship of the corresponding initial control signal pulses relative to a video signal recording function.

In particular, if the video recording and playback equipment and servo control shown in FIGS. 1 to 3 is employed, the phase positioning circuitry shown in FIGS. 17 and 18 may have the important function of assuring that the phase relationship of the control signal pulses relative to the angular positioning of the recording and playback heads 13 and 14 with respect to the magnetic pickups 28 and 29 is the same during playback as it was during recording when the progenitors of the decoded control signal pulses were formed.

In accordance with a preferred embodiment of the subject invention, it has been found that this phase relationship, which is important to the proper operation of the video display, may be restored with sufficient accuracy if the control signal pulses issued by the frequency multiplier shown in FIGS. 15 and 16 are shifted to a phase position that is synchronous to the phase position of the corresponding played-back control signal pulses received at the decoder input 351.

Prototypes of the illustrated decoder 350 were able to position the control signal pulses occurring at the output 353 to within ±0.2 milliseconds relative to the corresponding input pulses at the encoder input 351. A thermistor 461 in parallel to the resistor 409 has been found to reduce the temperature dependency of the oscillator 404. Remaining temperature dependent variations in the frequency provided by the oscillator 404 will be tolerated by the illustrated phase positioning circuit.

In general, this phase positioning circuit is able to tolerate a rate variation of ±1.75% from a normal 499.9 millisecond rate.

The positioning circuit operates in a digital manner and uses a clock generator 460 which may comprise the same NE555 integrated circuit as the VCO 404, a clock delay 416 which may comprise the same integrated circuit multivibrator SN74121 as the components 363, 386 and 415, a load delay multivibrator 464 which may be of the same type as the clock delay 461, a load pulse generator 463 which may also be of the same type as the clock delay 461, a rate detector 464 which may be of the same type SN74123 as the component 374, a J-K flip-flop element 465 which may be of the same integrated circuit type SN74107 as the flip-flop element 392, a shaper multivibrator 466 which may be the same type SN74121 as the elements 363, 386 and 415, a load multivibrator 467, shown in FIG. 17, which may also be of the same integrated circuit type SN74121 as the components 363, 386 and 415, a pair of J-K flip-flop elements 468 and 469 which may be of the same type SN4107 as the flip-flop element 392, and a number of counters 471, 472, 473, 474 and 475 which, by way of example, may be of the synchronous up/down counter type SN74191 shown, for instance, at pages 9-49 to 9-56 of the above mentioned CC-401 catalog.

With the aid of these counters, the phase positioning circuitry shown in FIGS. 17 and 18 performs three independent functions.

A first one of these, which employs the counter 471 shown in FIGS. 17 is to count the number of pulses generated by the frequency multiplier circuit of FIG. 16. Another function, which employs the counters 473 and 475 measures the time period between the last or fifteenth pulse of a set generated by the frequency multifier and the next played-back control pulse, and generates a preset number corresponding to the measured time function.

The third function, performed with the aid of the counters 472 and 474 shown in FIG. 17, uses the latter present number to step a counter down from its value to zero so that an accurate phase shift of a frequency multiplier pulse is accomplished in time that it can be used as an output pulse.

The sample pulse generator 415 shown in FIG. 16 drives the counter 471 shown in FIG. 17 via a lead 481 connecting the Q output of the sample pulse generator 415 to the clock input 482 of the counter 471. The down/up input and the data A, B, C and D inputs are connected to the ground bus 484.

Power is supplied to the counter 471 via a lead 485 from the positive voltage supply bus 486. The $Q_A$, $Q_B$, $Q_C$ and $Q_D$ outputs of the counter 471 are connected to the inputs of a NAND element 488.

The component 471 acts as a four stage counter which tabulates the number of pulses generated by the frequency multiplier circuit of FIG. 16. In particular, the rising edge of each sampling pulse applied via the lead 481 steps the counter 471.

When that counter reaches a count of 15, the gate 488 becomes activated and triggers the load multivibrator 467 via an inverter 489. A lead 491 applies the output pulse of the inverter 489 to the enable input 492 of the counter 471 to inhibit the counting operation.

The negative-edge triggered logic inputs 493 of the multivibrator 467 are grounded. A timing network 494 permits the triggered multivibrator 467 to issue a 1 microsecond pulse at its $\overline{Q}$ output 495. A lead 496 applies this pulse to the load inputs 497 and 498 of the counters 473 and 475 to immediately clear this eight stage counter. This readies the counter composed of the components 473 and 475 to measure the time between the last or 15th frequency multiplier pulse and the next played-back control pulse.

A lead 500 applies the high output of the inverter 489 to the J input of the flip-flop element 469. That flip-flop element and the flip-flop element 468 are clocked by the clock 460 shown in FIG. 18 via a lead 501. By way of example, the clock 460 is provided with a timing network 503 to provide an 8 kHz clock signal which is applied by a lead 505 to the positive Schmitt-trigger input of the clock delay element 461.

The clock delay element 461 is provided with a timing network 406 to impose upon the clock signal generated at 460 a time delay, such as of a duration of 10 microseconds, so that the count enable flip-flop elements 468 and 469 are properly clocked via the lead 501 which is connected to the Q output 508 of the clock delay elements 461.

The high output of the inverter 489 having been applied by the lead 500 to the J input of the flip-flop element 469 as described above, the next delayed clock pulse arriving via the lead 501 will set the flip-flop element 469. This action will enable the eight stage counters 473 and 475 to start counting the eight kHz clock pulses generated by the clock 460 shown in FIG. 18.

In particular, the $\overline{Q}$ output of the flip-flop element 469 is connected by a lead 511 to the enable inputs of the counters 473 and 474. The lead 505 shown in FIG. 18 and a lead 512 extending from FIG. 18 back to FIG. 17 connects the output of the clock 460 to the clock inputs of the counters 472 and 473.

The counting of the eight kHz clock pulses by the counters 473 and 474 will continue unil the flip-flop element 469 is reset by the trigger action of the one shot multivibrator 363 upon receipt of a played-back control signal pulse of the previously recorded train of encoded control signal pulses.

To this end, a lead 513, extending over FIGS. 15 and 17, connects the $\overline{Q}$ output 431 of the multivibrator 363 to the clear input of the flip-flop element 469.

Upon reset of the flip-flop element 469, the accumulated number in the counter composed of the stages 473 and 475 will represent the measured binary value of the time duration between the occurrence of the last or 15th pulse generated by the frequency multiplier of FIG. 16 and the next played-back control signal pulse arriving at the encoder input 351.

In a prototype of the illustrated encoder 350, the accuracy of that binary value was ±125 microseconds. The measured time period will vary but nominally is in the neighborhood of 21 milliseconds in the context of our above mentioned example.

The measured time differential is stored by the counter stages 473 and 475 until these stages are cleared by the load multivibrator 467 for uptake. As the frequency multiplier in our example is producing 15 pulses for every one played-back pulse of the encoded control signal, the stored time differential value is employed to phase shift each frequency multiplier pulse before issuing it as an output pulse to the servo control, as more fully described below.

Each new pulse from the frequency multiplier of FIG. 16, which is applied via the lead 481 to the counter 471, is also applied by a lead 515 to the J input of the flip-flop element 468. While this input is high, the falling edge of the next delayed clock pulse supplied by the clock delay 461, shown in FIG. 18, via the lead 501 to the clock input will set the flip-flop element 468. This enables the eight stage counter composed of the elements 472 and 474 to start counting down to zero from a preset value previously loaded into the counter in a manner more specifically described below. To this end, the $\overline{Q}$ output of the flip-flop element 468 is connected by leads 521 and 522 to the enable inputs of the counter stages 472 and 474.

Clock pulses generated at 460 in FIG. 18 step the counter stages 472 and 474 via the lead 512.

When the stepped down counter reaches zero it issues a positive pulse at the counter output 523. By way of example, this pulse may be 125 microseconds wide.

The output pulse of the counter stage 472 is applied by a lead 525 to an input of a NAND gate 526. The flip-flop element 465 being in its reset condition at that time, the output pulse of the counter stage 474 is inverted by the gate 526. At the end of the pulse duration (e.g. 125 milliseconds) the inverted pulse goes from ground level to ±5 volts. This excursion triggers the one shot multivibrator 466 to deliver a 200 microsecond output pulse to the base of a transistor 528. The transistor 528, in turn, applies a corresponding pulse to the output 353 of the encoder and hence to the terminal 53 of the servo control.

In this connection it will be noted that a lead 529 connects the output of the NAND gate 526 to the negative-edge triggered logic input of the multivibrator 466, and that that multivibrator is equipped with a suitable timing network 531 for providing the mentioned 200 microsecond pulse. A lead 532, extending from FIG. 18 to FIG. 17, feeds back a low level from the $\overline{Q}$ output of the multivibrator 466 to the clear input of the flip-flop element 468. This low level is complementary to the output pulse of the multivibrator 466 applied to the phase of the transistor 528 and, in our example, has a duration of 200 microseconds.

The latter low level resets the flip-flop element 468 and thus stops the counting action of the counter stages 472 and 474.

At that instant, the counter stages 472 and 474 become loaded with a preset number corresponding to the above mentioned measured binary value of time duration between the occurrence of the last or 15th frequency multiplier pulse and the next played-back encoded control pulse. To this end, the "1", "2", "4", "8", "16", "32", "64", and "128" outputs of the counter stages 473 and 475 are connected in parallel to corresponding inputs of the counter stages 472 and 474 for a broadside loading of the present number from the counter stages 473 and 475 to the counter stages 472 and 474.

In particular, when the counter stages 472 and 474 reach zero count, the multivibrator 462 is triggered by the output pulse of the counter stage 474 being applied via a lead 535 to the positive Schmitt-trigger input of the multivibrator 462. With the aid of a timing network 532 that multivibrator generates a 2 millisecond pulse which serves as a delay to allow the multivibrator 466 to generate the output pulse in the above mentioned manner.

At the end of 2 milliseconds (or any other time that may be found suitable in a given situation) the fall edge of the pulse generated by the multivibrator 462 triggers the one shot multivibrator 462 via its negative-edge triggered logic inputs 537.

With the aid of a timing network 538, that multivibrator generates a pulse of a suitable duration, such as 1 microsecond. A lead 539, extending over FIGS. 17 and 18, applies that $\overline{Q}$ output pulse of the multivibrator 463 as a load pulse to the load inputs 541 and 542 of the counter stages 472 and 474. In this manner, the counter stages 472 and 474 become loaded with the above mentioned preset number provided by the counter stages 473 and 475.

After the latter loading pulse, the counter stages 472 and 474 become enabled once more by the flip-flop element 368 in the above mentioned manner, and the count down operation is repeated.

The preset value or number stored in the counter stages 473 and 475 is updated every 499.9 milliseconds in our example. It will be noted in this respect that the illustrated circuitry is electronically geared in its operation so that the time measurement function executed with the aid of the counters 473 and 475 never interferes with the transfer of the preset value or number to the counter stages 472 and 474.

The illustrated decoder 350 also includes means, illustrated mostly in FIG. 18, to detect a change in the rate of the played-back control signal pulses so as to determine when unencoded pulses are being applied to the decoder input 351. For instance, if the played-back control pulse rate changes from 499.9 milliseconds to 33.33 milliseconds, this serves as an indication to the equipment that unencoded pulses are being played back from the control signal track of the tape.

Of course, no decoding function is necessary or even desired for the unencoded control pulses.

To this end, the multivibrator 464 has a timing network 542 which gives it a timing cycle such that its Q output goes high when the $\overline{Q}$ output pulses of the multivibrator 363, shown in FIG. 15, as applied via the leads 513 and 543 occur every 33.33 milliseconds, in our example.

The one shot operation of the multivibrator 464 enables the flip-flop element 465 through its J input to become set. This set state of the flip-flop elements 465 inhibits the gate 526, thereby preventing the output pulses issued by the counter stage 474 from triggering the multivibrator 466 in the above mentioned manner.

On the other hand, the set state of the flip-flop element 465 enables a NAND gate 551 whereby playedback control signal pulses proceed via the lead 372, an inverter 552 a lead 553 and the gate 551 to a negative-edge triggered input of the multivibrator 446. That multivibrator, in turn, issues pulses which are applied to the base of the transistor 528 and, after inversion by said transistor, become the decoded output pulses of the decoder 350, proceeding via output 353 and terminal 53 to the servo control system shown in FIGS. 2 and 3 to act as control pulses for the playback control operation.

A gate 555 is connected to the leads 491 and 553 to reset the counter 471 via a lead 556 at the fall edge of a played-back control signal pulse if the counter 471 is then in counting state 15.

The utility of the subject invention is not limited to video tape recording. Rather, it can be employed with video film recording, video disk recording and other forms of recording where a recorded signal is employed to control reproduction of the information from the recording medium.

The subject extensive disclosure will suggest or render apparent to those skilled in the art various modifications and variations within the spirit and scope of this invention.

We claim:

1. In a method of recording and subsequently reproducing video signals including video and synchronization information, the improvement comprising in combination the steps of:
   recording said video signals and first control information distinct from said video and synchronization information on a recording medium;
   reproducing said video signals with the aid of second control information being distinct from said video and synchronization information for controlling the reproduction of said video information from said recording medium;
   said first control information being rendered incapable as recorded of controlling the reproduction of said video signals upon reproduction of said first control information; and
   said second control information being provided by reproducing said recorded first control information from said recording medium and converting at least part of said reproduced first control information to said second control information.

2. A method as claimed in claim 1, wherein:
   said first control information is composed of a first part and a second part;
   both said first and second parts of said control information are recorded and are subsequently reproduced; and
   only said first part of the reproduced first control information is converted to said second control information for controlling the reproduction of said video information.

3. In a method of recording video signals including video and synchronization information and subsequently reproducing said video signals with reproduction equipment requiring control information distinct from said video and synchronization information and conforming to a predetermined standard, the improvement comprising in combination the steps of:
   providing substandard control information distinct from said video and synchronization information and capable of being converted to control information conforming to said predetermined standard;
   recording said video signals and said substandard control information on a recording medium;
   reproducing said substandard control information with said reproduction equipment from said recording medium;
   converting said reproduced substandard control information to control information conforming to said predetermined standard; and
   reproducing said video signals and controlling continued reproduction of said recorded video signals from said recording medium with the latter control information conforming to said predetermined standard.

4. A method as claimed in claim 3, wherein:
   said substandard control information is composed of a first part capable of being converted to control information conforming to said predetermined standard, and a second part for concealing the nature of said first part;
   both said first and second parts of said substandard control information are recorded and are subsequently reproduced; and
   only said first part of the reproduced substandard control information is converted to said standard control information for controlling continued reproduction of said recorded video information.

5. In a method of recording video signals including video and synchronization information and subsequently reproducing said video signals with reproduction equipment requiring second control information distinct from said video and synchronization information and having at least a predetermined number of pulses per second, the improvement comprising in combination the steps of:

providing first control information distinct from said video and synchronization information and having less than said predetermined number of pulses per second;

recording said video signals and said first control information on a recording medium;

reproducing said first control information from said recording medium;

generating said second control information having at least said predetermined number of pulses per second with said reproduced first control information; and reproducing said video signals and controlling continued reproduction of said recorded video signals from said recording medium with said generated second control information.

6. A method as claimed in claim 5, wherein:

said first control information is composed of a first signal for controlling generation of said second control information, and a second signal for concealing the nature of said first signal; and both said first and second signals of said first control information are recorded and are subsequently reproduced.

7. In a method of recording video signals including video and synchronization information for subsequent reproduction with the aid of second control information for controlling the reproduction of said video signals, the improvement comprising in combination the steps of:

providing first control information distinct from said video and synchronization information and incapable of controlling the reproduction of said video signals but being convertible to said second control information;

recording said video signals and first control information distinct from said video and synchronization information; and recording with said first control information a supplemental signal for concealing the nature of said first control information.

8. In a method of recording video signals including video and synchronization information for subsequent reproduction with reproduction equipment requiring control information conforming to a predetermined standard, the improvement comprising in combination the steps of:

providing substandard control information distinct from said video and synchronization information and capable of being converted to control information conforming to said predetermined standard;

recording said video signals and said substandard control information distinct from said video and synchronization information on a recording medium; and recording with said substandard control information a supplemental signal for concealing the nature of said substandard control information.

9. In a method of recording video signals including video and synchronization information for subsequent reproduction with reproduction equipment requiring second control information having at least a predetermined number of pulses per second, the improvement comprising in combination the steps of:

providing first control information distinct from said video and synchronization information and having less than said predetermined number of pulses per second for controlling generation of said second control information upon reproduction; and recording said video signals and said first control information distinct from said video and synchronization information.

10. A method as claimed in claim 9, including the steps of:

composing said first control information of a first signal for controlling generation of said second control information upon reproduction, and a second signal for concealing the nature of said first signal; and recording both said first and second signals of said first control information.

11. In a method of reproducing video signals including video and synchronization information having been recorded on a recording medium together with first control information distinct from said video and synchronization information and being incapable of controlling the reproduction of said video signals, the improvement comprising in combination the steps of:

composing said recorded first control information of a recorded first part and a recorded second part for concealing the nature of said recorded first part;

reproducing both said recorded first and second parts of said first control information;

distinguishing said reproduced first part of said first control information from said reproduced second part;

converting said distinguished reproduced first part of said first control information to second control information distinct from said video and synchronization information for controlling reproduction of said video signals from said recording medium; and reproducing said video signals and controlling continued reproduction of said video signals from said recording medium with said second control information.

12. In a method of reproducing video signals including video and synchronization information having been recorded on a recording medium together with substandard control information distinct from said video and synchronization information and capable of being converted to standard control information for controlling reproduction of said video signals from said recording medium, the improvement comprising in combination the steps of:

composing said recorded standard control information of a recorded first part capable of being converted to said standard control information and a recorded second part for concealing the nature of said first part;

reproducing both said recorded first and second parts of said substandard control information;

distinguishing said reproduced first part from said reproduced second part;

converting said reproduced first part of said substandard control information to said standard control information; and reproducing said video signals and controlling continued reproduction of said recorded video signals from said recording medium with the latter standard control information.

13. In a method of reproducing video signals including video and synchronization information having been recorded on a recording medium together with first control information distinct from said video and synchronization information and having an insufficient number of pulses per second for controlling the reproduction of said video signals from said recording medium, the improvement comprising in combination the steps of:
  reproducing said first control information having said insufficient number of pulses per second;
  generating with said reproduced first control information second control information having a sufficient number of pulses per second for controlling the reproduction of said video signals from said recording medium; and
  reproducing said video signals and controlling continued reproduction of said video signals from said recording medium with said generated speed control information.

14. A method as claimed in claim 13, wherein:
  said first control information is composed of a first signal for controlling generation of said second control information, and a second signal for concealing the nature of said first signal;
  both said first and second signals are reproduced from said recording medium; and
  only said reproduced first signal is employed for generation of said second control information.

15. In apparatus for recording and subsequently reproducing video signals including video and synchronization information on and from a recording medium, the improvement comprising in combination:
  means for recording said video signals and first control information distinct from said video and synchronization information on said recording medium;
  means for reproducing said video information with the aid of second control information being distinct from said video and synchronization information for controlling the reproduction of said video signals from said recording medium;
  said apparatus including means connected to said recording means for rendering said first control information incapable as recorded of controlling the reproduction of said video signals upon reproduction of said first control information; and
  said apparatus including means for providing said second control information, said second control information providing means including means for reproducing said recorded first control information from said recording medium and means for converting at least part of the reproduced first control information to said second control information.

16. An apparatus as claimed in claim 15, wherein:
  said apparatus includes means for composing said first control information of a first part and a second part;
  said recording means include means for recording both said first and second parts of said control information;
  said apparatus include means for reproducing said first and second control information parts; and
  said second control information providing means include means for converting only said first part of the reproduced first control information to said second control information for controlling the reproduction of said video signals.

17. In apparatus for recording video signals including video and synchronizing information on a recording medium and subsequently reproducing said video signals with reproduction equipment requiring control information conforming to a predetermined standard, the improvement comprising in combination:
  means for providing substandard control information distinct from said video and synchronization information and capable of being converted to control information conforming to said predetermined standard;
  means for recording said video signals and said substandard control information on said recording medium;
  means for reproducing said substandard control information with said reproduction equipment from said recording medium;
  means connected to said control information reproducing means for converting said reproduced substandard control information to control information conforming to said predetermined standard;
  means for reproducing said video signals; and
  means connected to said converting means for controlling continued reproduction of said recorded video signals from said recording medium with the latter control information conforming to said predetermined standard.

18. An apparatus as claimed in claim 17, wherein:
  said apparatus includes means for composing said substandard control information of a first part capable of being converted to control information conforming to said predetermined standard, and a second part for concealing the nature of said first part;
  said recording means include means for recording both said first and second parts of said substandard control information;
  said converting means include means for converting only said first part of the reproduced substandard control information to said standard control information for controlling continued reproduction of said recorded video signals.

19. In apparatus for recording video signals including video and synchronization information on a recording medium and subsequently reproducing said video signals with reproduction equipment requiring second control information having at least a predetermined number of pulses per second, the improvement comprising in combination:
  means for providing first control information distinct from said video and synchronization information and having less than said predetermined number of pulses per second;
  means for recording said video signals and said first control information on said recording medium;
  means for reproducing said first control information from said recording medium;
  means connected to said reproducing means for generating said second control information having at least said predetermined number of pulses per second with said reproduced first control information; and
  means for reproducing said video signals and controlling continued reproduction of said recorded video signals from said recording medium with said generated second control information.

20. An apparatus as claimed in claim 19, wherein:
  said apparatus includes means for composing said first control information of a first signal for controlling generation of said second control information, and a second signal for concealing the nature of said first signal; and said recording means include means for recording both said first and second signals of said first control information.

21. In apparatus for recording video signals including video and synchronization information for subsequent reproduction with the aid of second control information for controlling the reproduction of said video information, the improvement comprising in combination:
   means for providing first control information distinct from said video and synchronization information and incapable of controlling the reproduction of said video information but being convertible to said second control information:
   means connected to said control information providing means for recording said video signals and first control information; and
   means for recording with said first control information a supplemental signal for concealing the nature of said first control information.

22. In apparatus for recording video signals including video and synchronization information for subsequent reproduction with reproduction equipment requiring control information conforming to a predetermined standard, the improvement comprising in combination:
   means for providing substandard control information distinct from said video and synchronization information and capable of being converted to control information conforming to said predetermined standard;
   means connected to said control information providing means for recording said video signals and said substandard control information on said recording medium; and
   means for recording with said substandard control information a supplemental signal for concealing the nature of said substandard control information.

23. In apparatus for recording video signals including video and synchronization information for subsequent reproduction with reproduction equipment requiring second control information having at least a predetermined number of pulses per second, the improvement comprising in combination:
   means for providing first control information distinct from said video and synchronization information and having less than said predetermined number of pulses per second for controlling generation of said second control information upon reproduction; and
   means connected to said control information providing signals for recording said video signals and said first control information.

24. An apparatus as claimed in claim 23, including:
   means for composing said first control information of a first signal for controlling generation of said second control information upon reproduction, and a second signal for concealing the nature of said first signal; and
   means for recording both said first and second signals of said first control information.

25. In apparatus for reproducing video signals including video and synchronization information having been recorded on a recording medium together with first control information distinct from said video and synchronization information, being incapable and being composed of a recorded first part and a recorded second part for concealing the nature of said recorded first part, the improvement comprising in combination:
   means for reproducing both said recorded first and second parts of said first control information;
   means connected to said reproducing means for converting said reproduced first part of said first control information to second control information distinct from said video and synchronization information for controlling reproducing of said video signals from said recording medium;
   means for reproducing said video signals; and
   means connected to said converting means for controlling reproduction of said video signals from said recording medium with said second control information.

26. In apparatus for reproducing video signals including video and synchronization information having been recorded on a recording medium together with substandard control information distinct from said video and synchronization information and capable of being converted to standard control information for controlling reproduction of said video information from said recording medium, said substandard control information being composed of a first part capable of being converted to said standard control information and a second part for concealing the nature of said first part, the improvement comprising in combination:
   means for reproducing both said first and second parts of said substandard control information;
   means connected to said reproducing means for converting said reproduced first part of said substandard control information to said standard control information;
   means for reproducing said video signals; and
   means connected to said converting means for controlling continued reproduction of said recorded video signals from said recording medium with the latter standard control information.

27. In apparatus for reproducing video signals including video and synchronization information having been recorded on a recording medium together with first control information distinct from said video and synchronization information and having an insufficient number of pulses per second for controlling the reproduction of said video signals from said recording medium, the improvement comprising in combination:
   means for reproducing said first control information having said insufficient number of pulses per second;
   means connected to said reproducing means for generating with said reproduced first control information second control information having a sufficient number of pulses per second for controlling the reproduction of said video signals from said recording medium; and
   means connected to said converting means for controlling reproduction of said video signals from said recording medium with said second control information.

28. In apparatus for reproducing from a recording medium recorded video signals including video and synchronization information and being accompanied, in a first case, by first control information distinct from said video and synchronization information and incapable of controlling the reproduction of said video signals and, in a second case, by second control information distinct from said video and synchronization information and capable of controlling the reproduction of said video signals, the improvement comprising in combination:

means for reproducing said first control information in said first case and said second control information in said second case;

means connected to said reproducing means for converting in said first case at least part of said reproduced first control information to third control information distinct from said video and synchronization information and capable of controlling the reproduction of said video signals from said recording medium;

means for reproducing said video signals; and means for controlling reproduction of said video signals from said recording medium in said first case with said third control information, and in said second case with said second control information.

29. An apparatus as claimed in claim 28, including:

means connected to said control information reproducing means for distinguishing the presence of reproduced second control information from the presence of reproduced first control information; and means connected to said distinguishing means and to said converging means for inhibiting the function of said converting means during the presence of reproduced second control information.

30. In apparatus for reproducing from a recording medium recorded video signals including video and synchronization information and being accompanied by first control information distinct from said video and synchronization information and incapable of controlling the reproduction of said video signals, the improvement comprising in combination:

means for reproducing said first control information;

means for reproducing said video signals from said recording medium including rotary reproducing means and means for rotating said video signal reproducing means relative to said recording medium;

means connected to said control information reproducing means for converting at least part of said reproduced first control information to second control information distinct from said video and synchronization information and capable of controlling the reproduction of said video signals from said recording medium;

means connected to said converting means for modifying a phase of said second control information in accordance with an operation of said rotating video signal reproducing means; and means for controlling reproduction of said video signals from said recording medium with said phase modified second control information.

31. An apparatus as claimed in claim 30, wherein:

said first control information comprises a number of first pulses being insufficient to effect control of said reproduction of the video signals;

said converting means include means for providing said second control information with a number of second pulses sufficient to effect control of said reproduction of the video signals; and said modifying means include means for shifting the phase of said second pulses into correspondence with an operation of said video signal providing means.

32. An apparatus as claimed in claim 30 wherein:

said modifying means include means for shifting the phase of said second control information to the phase of said reproduced first control information.

33. In apparatus for recording and subsequently playing back video signals including video and synchronization information on and from a recording medium, the improvement comprising in combination:

means for recording said video signals and first control information distinct from said video and synchronization information on said recording medium;

playback means for effecting a playback of said video information from said recording medium;

means connected to said playback means for controlling the playback of said video signals from said recording medium with second control information being distinct from said video and synchronization information;

said apparatus including means connected to said recording means for rendering said first control information incapable as recorded of controlling the playback of said video signals upon reproduction of said first information; and said apparatus including means for providing said second control information, said second control information providing means including means for reproducing said recorded first control information from said recording medium and means for converting at least part of the reproduced first control information to said second control information.

34. In apparatus for recording video signals including video and synchronization information on a recording medium and subsequently playing back said video signals with playback equipment requiring control information conforming to a predetermined standard, the improvement comprising in combination:

means for providing substandard control information distinct from said video and synchronization information and capable of being converted to control information conforming to said predetermined standard;

means for recording said video signals and said substandard control information on said recording medium;

mean for playing back said substandard control information with said playback equipment from said recording medium;

means connected to said control information playback means for converting said played back substandard control information to control information conforming to said predetermined standard;

playback means for playing back said video signals; and means connected to said converting means for controlling continued playback of said recorded video signals from said recording medium with the latter control information conforming to said predetermined standard.

35. In a method of recording and subsequently reproducing video signals including video and synchronization information, the improvement comprising in combination the steps of:

establishing on the same recording medium a record of said video signals including said video and synchronization information and a further record of control information distinct from said video and synchronization information;

reproducing said video signals with the aid of second control information being distinct from said video and synchronization information;

said first control information as present in said further record being incapable of controlling the reproduction of said video signals upon reproduction of said first control information; and said second control information being provided by reproducing said recorded first control information from said further record and converting at least part of said reproduced first control information to said second control information.

36. In a method of recording video signals including video and synchronization information and subsequently reproducing said video signals with reproduction equipment requiring control information distinct from said video and synchronization information and conforming to a predetermined standard, the improvement comprising in combination the steps of:

providing substandard control information distinct from said video and synchronization information and capable of being converted to control information conforming to said predetermined standard;

establishing on the same recording medium a record of said video signals and a further record of said substandard control information;

reproducing said substandard control information with said reproduction equipment from said recording medium;

converting said reproduced substandard control information to control information conforming to said predetermined standard; and reproducing said video signals and controlling continued reproduction of said recorded video signals from said recording medium with the latter control information conforming to said predetermined standard.

37. In a method of recording video signals including video and synchronization information for subsequent reproduction with reproduction equipment requiring control information conforming to a predetermined standard, the improvement comprising in combination the steps of:

providing substandard control information distinct from said video and synchronization information and capable of being converted to control information conforming to said predetermined standard; and establishing on the same recording medium a record of said video signals including said video and synchronization information, and a further record of said substandard control information distinct from said record of said video signals including video and synchronization information on a recording medium.

38. In a method of reproducing recorded video signals including video and synchronization information from a first record on a recording medium bearing also a second record of first control information distinct from said video and synchronization information and incapable of controlling the reproduction of said video signals, the improvement comprising in combination the steps of:

reproducing said first control information from said second record on said recording medium;

converting at least part of said reproduced first control information to second control information distinct from said video and synchronization information for controlling reproduction of said video signals from said recording medium; and reproducing said video signals including said video and synchronization information from said first record on said recording medium and controlling continued reproduction of said video signals from said first record on said recording medium with said second control information.

39. In a method of recording and subsequently reproducing video signals including video and synchronization information, the improvement comprising in combination the steps of:

establishing on the same recording medium a record of said video signals and a further record of first control information distinct from said video and synchronization information;

effecting a playback of said video signals from said recording medium and controlling said playback of said video signals from said recording medium with second control information being distinct from said video and synchronization information;

said first control information as recorded in said further record being incapable of controlling the playback of said video signals upon reproduction of said first control information; and said second control information being provided by reproducing said recorded first control information from said further record or said recording medium and converting at least part of said reproduced first control information to said second control information.

40. In a method of recording video signals including video and synchronization information and subsequently playing back said video signals with playback equipment requiring control information distinct from said video and synchronization information and conforming to a predetermined standard, the improvement comprising in combination the steps of:

providing substandard control information distinct from said video and synchronization information and capable of being converted to control information conforming to said predetermined standard;

establishing on the same recording medium a record of said video signals and a further record of said substandard control information;

effecting a playback of said substandard control information with said playback equipment from said further record on said recording medium;

converting said played back substandard control information to control information conforming to said predetermined standard; and effecting a playback of said video signals and controlling continued playback of said recorded video signals from said recording medium with the latter control information conforming to said predetermined standard.

41. In apparatus for recording and subsequently reproducing video signals including video and synchronization information on and from a recording medium, the improvement comprising in combination:

means for establishing on said recording medium a record of said video signals including said video and synchronization information and, on the same recording medium, a further record of first control information distinct from said video and synchronization information;

means for reproducing said video information with the aid of second control information being distinct from said video and synchronization information;

said apparatus including means for rendering said first control information as present in said further record incapable of controlling the reproduction of said video signals upon reproduction of said first control information; and said apparatus including means for providing said second control information, said second control information providing means including means for reproducing said recorded first control information from said further record and means for converting at least part of the reproduced first control information to said second control information.

42. In apparatus for recording video signals including video and synchronization information on a recording medium and subsequently reproducing said video signals with reproduction equipment requiring control information conforming to a predetermined standard, the improvement comprising in combination:

means for providing substandard control information distinct from said video and synchronization information and capable of being converted to control information conforming to said predetermined standard, said control information providing means including means for rendering said substandard control information incapable, prior to its conversion to control information conforming to said predetermined standard, of controlling reproduction of said recorded video signals from said recording medium;

means for establishing on said recording medium a record of said video signals and a further record of said substandard control information;

means for reproducing said substandard control information with said reproduction equipment from said further record on said recording medium;

means connected to said control information reproducing means for converting said reproded substandard control information to control information conforming to said predetermined standard;

means for reproducing said video signals; and means connected to said converting means for controlling continued reproduction of said recorded video signals from said recording medium with the latter control information conforming to said predetermined standard.

43. In apparatus for recording video signals including video and synchronization information for subsequent reproduction with reproduction equipment requiring control information conforming to a predetermined standard, the improvement comprising in combination:

means for providing substandard control information distinct from said video and synchronization information and capable of being converted to control information conforming to said predetermined standard, said control information providing means including means for rendering said substandard control information incapable, prior to its conversion to control information conforming to said predetermined standard, of controlling reproduction of said recorded video signals from said recording medium; and means connected to said control information providing means for recording said video signals and said substandard control information on said recording medium.

44. In apparatus for recording and subsequently playing back video signals including video and synchronization information on and from a recording medium, the improvement comprising in combination:

means for establishing on said recording medium a record of said video signals and on the same recording medium a further record of said first control information distinct from said video and synchronization information;

playback means for effecting a playback of said video information from said recording medium;

means connected to said playback means for controlling the playback of said video signals from said recording medium with second control information being distinct from said video and synchronization information;

said apparatus including means connected to said recording means for rendering said first control information incapable as recorded of controlling the playback of said video signals upon reproduction of said first control information; and said apparatus including means for providing said second control information, said second control information providing means including means for reproducing said recorded first control information from said further record on said recording medium and means for converting at least part of the reproduced first control information to said second control information.

45. In apparatus for recording video signals including video and synchronization information on a recording medium and subsequently playing back said video signals with playback equipment requiring control information conforming to a predetermined standard, the improvement comprising in combination:

means for providing substandard control information distinct from said video and synchronization information and capable of being converted to control information conforming to said predetermined standard;

means for establishing on the same recording medium a record of said video signals and a further record of said substandard control information;

means for playing back said substandard control information with said playback equipment from said further record on said recording medium;

means connected to said control information playback means for converting said played back substandard control information to control information conforming to said predetermined standard;

playback means for playing back said video signals; and means connected to said converting means for controlling continued playback of said recorded video signals from said recording medium with the latter control information conforming to said predetermined standard.

46. In a method of reproducing recorded video signals including video and synchronization information from a first record on a recording medium bearing also a second record of first control information distinct from said video and synchronization information and incapable of controlling the reproduction of said video signals, the improvement comprising in combination the steps of:

reproducing said first control information from said second record on said recording medium;

converting at least part of said reproduced first control information to second control information distinct from said video and synchronization information for controlling reproduction of said video signals from said recording medium; and reproducing said video signals from said first record on said recording medium with playback head means moving relatively to said recording medium; and controlling the velocity of said playback head means with said second control information.

47. In a method of reproducing recorded video signals including video and synchronization information from a first record on a recording medium bearing also a second record of substandard control information distinct from said video and synchronization information and capable of being converted to standard control information for controlling reproduction of said video signals from said recording medium, the improvement comprising in combination the steps of:

reproducing said substandard control information from said second record on said recording medium;

converting said reproduced substandard control information to said standard control information; and reproducing said video signals from said first record on said recording medium with playback head means moving relatively to said recording medium; and controlling the velocity of said playback head means with said second control information.

48. In apparatus for reproducing recorded video signals including video and synchronization information from a first record on a recording medium bearing also a second record of first control information distinct from said video and synchronization information and incapable of controlling the reproduction of said video signals, the improvement comprising in combination:

means for reproducing said first control information from said second record on said recording medium;

means connected to said reproducing means for converting at least part of said reproduced first control information to second control information distinct from said video and synchronization information for controlling reproduction of said video signals from said recording medium;

means for reproducing said video signals from said first record on said recording medium with playback head means moving relatively to said recording medium; and means connected to said converting means for controlling reproduction of said video signals from said recording medium with said second control information, said controlling means including means for controlling the velocity of said playback head means with said second control information.

49. In apparatus for reproducing recorded video signals including video and synchronization information from a first record on a recording medium bearing also a second record of substandard control information distinct from said video and synchronization information and capable of being converted to standard control information for controlling reproduction of said video information from said recording medium, the improvement comprising in combination:

means for reproducing said substandard control information from said second record on said recording medium;

means connected to said reproducing means for converting said reproduced substandard control information to said standard control information;

means reproducing said video signals from said first record on said recording medium with playback head means moving relatively to said recording medium; and means connected to said converting means for controlling continued reproduction of said recorded video signals from said recording medium with the latter standard control information, said controlling means including means for controlling the velocity of said playback head means with said second control information.

50. In apparatus for reproducing from a recording medium recorded video signals including video and synchronization information and being accompanied, in a first case, by first control information distinct from said video and synchronization information and incapable of controlling the reproduction of said video signals and, in a second case, by second control information distinct from said video and synchronization information and capable of controlling the reproduction of said video signals, the improvement comprising in combination:

means for reproducing said first control information in said first case and said second control information in said second case;

means connected to said reproducing means for converting in said first case at least part of said reproduced first control information to third control information distinct from said video and synchronization information and capable of controlling the reproduction of said video signals from said recording medium;

means for reproducing said video signals with playback head means moving relatively to said recording medium; and means for controlling reproduction of said video signals from said recording medium in said first case with said third control information, and in said second case with said second control information, said reproduction controlling means including means for controlling the velocity of said playback head means with said third control information in said first case, and with said second control information in said second case.

* * * * *